(12) United States Patent
Appel

(10) Patent No.: US 11,858,679 B2
(45) Date of Patent: Jan. 2, 2024

(54) METHOD FOR PRODUCING A CONTAINER FROM A CONTAINER BLANK, IN PARTICULAR WITH A REDUCTION IN THE HEIGHT OF THE CONTAINER BLANK

(71) Applicant: SIG TECHNOLOGY AG, Neuhausen am Rheinfall (CH)

(72) Inventor: Volker Appel, Dormagen (DE)

(73) Assignee: SIG Technology AG, Neuhausen am Rheinfall (CH)

( * ) Notice: Subject to any disclaimer, the term of this patent is extended or adjusted under 35 U.S.C. 154(b) by 841 days.

(21) Appl. No.: 16/639,685

(22) PCT Filed: Aug. 15, 2018

(86) PCT No.: PCT/EP2018/072149
§ 371 (c)(1),
(2) Date: Feb. 17, 2020

(87) PCT Pub. No.: WO2019/034704
PCT Pub. Date: Feb. 21, 2019

(65) Prior Publication Data
US 2020/0262599 A1      Aug. 20, 2020

(30) Foreign Application Priority Data
Aug. 18, 2017  (DE) .......................... 102017214469.6

(51) Int. Cl.
*B29C 49/00* (2006.01)
*B65D 1/02* (2006.01)
(Continued)

(52) U.S. Cl.
CPC ........ *B65D 1/0207* (2013.01); *B29C 49/0005* (2013.01); *B29C 49/48* (2013.01);
(Continued)

(58) Field of Classification Search
CPC ........ B65D 23/08; B65D 1/40; B65D 1/0207; B65D 23/02; D21J 3/10; D21J 7/00;
(Continued)

(56) References Cited

U.S. PATENT DOCUMENTS 6,860,461 B1    3/2005  Otani et al.
7,048,975 B1 *  5/2006  Tojo .................... B65D 1/0215
                                                    428/34.3
(Continued)

FOREIGN PATENT DOCUMENTS

DE    602004005823       1/2008
DE    202012013166 U1    4/2015
(Continued)

OTHER PUBLICATIONS

Written Opinion of the International Searching Authority; European Patent Office; International Application No. PCT/EP2018/072149; dated Oct. 12, 2018; 11 pages.
(Continued)

*Primary Examiner* — Monica A Huson
(74) *Attorney, Agent, or Firm* — Taft Stettinius & Hollister LLP

(57) ABSTRACT

The invention relates to a method comprising, as method steps,
  a) providing a container blank comprising a blank wall at least partly surrounding a blank interior, comprising
    i) a multitude of particles, and
    ii) a liquid in a first proportion of liquid; and
  b) shaping the container blank thereby obtaining a container comprising a container wall which at least partly surrounds a container interior and comprises a container layer comprising
    i) the particles of the multitude of particles, and
    ii) the liquid in a further proportion of liquid;
(Continued)

Figure 1:
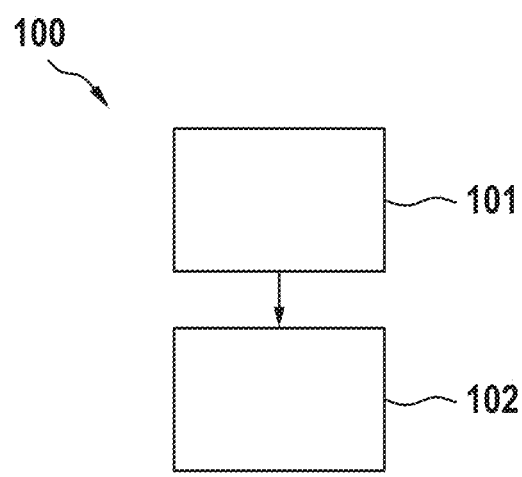

wherein the further proportion of liquid is less than the first proportion of liquid. The invention further relates to a container obtainable by the above method; to a container having a container layer; to a method of filling and closing one of the aforementioned containers; to a closed container obtainable by said method; to an apparatus; and to uses of a filling machine, of one of the aforementioned containers, of the apparatus and of a multitude of fibers.

14 Claims, 17 Drawing Sheets

(51) Int. Cl.
| | |
|---|---|
| *B29C 49/48* | (2006.01) |
| *B65B 1/02* | (2006.01) |
| *B65B 1/04* | (2006.01) |
| *B65D 1/40* | (2006.01) |
| *B65D 23/02* | (2006.01) |
| *B65D 23/08* | (2006.01) |
| *B29K 311/14* | (2006.01) |
| *B29L 31/00* | (2006.01) |

(52) U.S. Cl.
CPC .................. *B65B 1/02* (2013.01); *B65B 1/04* (2013.01); *B65D 1/40* (2013.01); *B65D 23/02* (2013.01); *B65D 23/08* (2013.01); *B29C 2949/078* (2022.05); *B29C 2949/0778* (2022.05); *B29C 2949/20* (2022.05); *B29K 2311/14* (2013.01); *B29L 2031/7158* (2013.01)

(58) Field of Classification Search
CPC ......... B65B 1/04; B65B 1/02; B29C 49/0005; B29C 49/24; B29C 49/48; B29C 49/071; B29C 2949/078; B29C 2949/28; B29C 2949/0715; B29C 2949/26; B29C 2949/20; B29C 2949/22; B29C 2949/0778; B29C 2049/2404; B29C 2949/24; B29B 11/14; B29L 2031/7158; B29K 2311/10; B29K 2311/14
See application file for complete search history.

(56) References Cited

U.S. PATENT DOCUMENTS

| | | |
|---|---|---|
| 9,969,115 B2 | 5/2018 | Sisson et al. |
| 10,526,120 B2 | 1/2020 | Berk et al. |
| 2003/0145968 A1 | 8/2003 | Kumamoto et al. |

FOREIGN PATENT DOCUMENTS

| | | |
|---|---|---|
| EP | 1081285 A1 | 3/2001 |
| EP | 1126083 | 8/2001 |
| EP | 2522772 A1 | 11/2012 |
| WO | 2007011567 | 1/2007 |
| WO | 2013192260 | 12/2013 |

OTHER PUBLICATIONS

International Search Report; European Patent Office; International Application No. PCT/EP2018/072149; dated Oct. 12, 2018; 5 pages.
Akzo Nobel; Eka Facts; Eka ATC 4150; Jul. 5, 2006; 1 page; www.eka.com.
Akzo Nobel; Eka Facts; Eka DR 25 SF; Oct. 1, 2004; 1 page; www.eka.com.

* cited by examiner

METHOD FOR PRODUCING A CONTAINER FROM A CONTAINER BLANK, IN PARTICULAR WITH A REDUCTION IN THE HEIGHT OF THE CONTAINER BLANK

CROSS-REFERENCE TO RELATED APPLICATIONS

This application is a U.S. National Phase of International PCT Application No. PCT/EP2018/072149 filed Aug. 15, 2018, which claims priority to German Patent Application Serial No. 10 2017 214 469.6 filed Aug. 18, 2017, the contents of each application are incorporated herein by reference in their entirety.

The present invention relates to a method comprising, as method steps,
   a) providing a container blank comprising a blank wall at least partly surrounding a blank interior, comprising
      i) a multitude of particles, and
      ii) a liquid in a first proportion of liquid; and
   b) shaping the container blank thereby obtaining a container comprising a container wall which at least partly surrounds a container interior and comprises a container layer comprising
      i) the particles of the multitude of particles, and
      ii) the liquid in a further proportion of liquid;
wherein the further proportion of liquid is less than the first proportion of liquid. The invention further relates to a container obtainable by the above method; to a container having a container layer; to a method of filling and closing one of the aforementioned containers; to a closed container obtainable by said method; to an apparatus; and to uses of a filling machine, of one of the aforementioned containers, of the apparatus and of a multitude of fibers.

The prior art discloses various containers for the dispensing, transporting and storing of free-flowing food or drink products, whether they be food or drink products for human consumption or else animal nutrition products. Typical demands on these containers are a low intrinsic weight for transport; maximum variety of shape in container production; suitability for storage with maximum saving of space and for transport with maximum saving of space and weight efficiency; mechanical stability, especially in the stacking and the emptying of the containers; leaktightness; openability; and pouring characteristics. A further demand which is gaining increasing significance is environmental compatibility. This in turn is an umbrella term for numerous aspects, for example consumption of raw materials and energy in the container production, the use of a maximum proportion of renewable raw materials, suitability for recycling, and tolerability in respect of health. Illustrative free-flowing food or drink products are beverages. There follows a brief discussion of typical beverage containers known in the prior art.

Containers that have long been known for beverages are bottles, especially glass bottles. Glass bottles, because of their essentially cylindrical shape, have the disadvantage that very dense and space-saving storage is barely possible. At the same time, glass bottles are limited to this shape by virtue of their manufacturing method. Although other shapes are also obtainable specifically from glass, these require some additional complexity in manufacture and often lead to glass bottles that are disadvantageous in other ways, for example less stable. Glass bottles fundamentally have a considerable disadvantage here by virtue of their fragility, which additionally involves a risk of injury. For that reason, glass bottles are banned at many major public events. Moreover, glass bottles have considerable intrinsic weight, which leads to increased energy expenditure in transport. In addition, production of glass, even when the glass used for the purpose has been recycled, necessitates quite a high expenditure of energy. An additional aggravating factor is elevated expenditure on transport. The glass bottles are usually prefabricated in a glass factory and then have to be transported to the facility where the beverage is dispensed with the use of considerable transport volumes.

Other prior art bottles are manufactured from plastic. These plastic bottles have some improvements with regard to the above disadvantages. However, plastic bottles having low intrinsic weight often have limited mechanical stability. It is thus not uncommon for plastic bottles to contract in the course of pouring, and hence for some of the contents to be spilled. Attempts are often made in the prior art to reduce this problem, for example by means of appropriate corrugations in the bottle wall. However, this is often successful only to a limited degree. If plastic bottles, by contrast, are to be more dimensionally stable, their wall has to be made correspondingly thick, which considerably increases the intrinsic weight of the bottles and raw material consumption. The latter is particularly disadvantageous for plastic bottles since these are usually manufactured from non-renewable raw materials in large portions. The obtaining of the plastic usually entails intensive petrochemical processes, and recycling is comparatively complex. Biodegradation of the plastic is barely possible to date. Plastic bottles are not very environmentally friendly for various reasons.

A further development known in the prior art in the field of containers for beverages is that of film bags. These containers made of an often multilayer composite film have zero dimensional stability, which leads to considerable disadvantages. In the course of storage and transport, the bags can easily be damaged, which makes them leaky. Moreover, opening aids have to be provided by the manufacturer for opening of the bags, or it is necessary to use tools, for example scissors, for opening. A considerable problem for the end user that arises when using the film bags is the pouring characteristics. The lack of dimensional stability often results in spillage of container contents. Moreover, the opened bags are difficult to store. For the milk bags that used to be widespread, an attempt was made here to provide a remedy with special milk bag holders, a solution that was obviously not very satisfactory. Thus, this additional holding apparatus must be fitted exactly to the size of the milk bag. If the milk bag has been emptied to a certain degree, the holder no longer fits and is no longer suitable for pouring. The disadvantages of the film bags are so considerable that milk bags, for example, are barely still encountered on the market.

The disadvantages of dimensionally unstable containers are avoided by containers manufactured from foldable composites, called laminates. These laminates, as well as a multitude of polymer layers, typically comprise a cardboard layer that imparts dimensional stability thereto. Moreover, these laminates typically have a barrier layer that increases impermeability. This layer is often manufactured from aluminum. The containers are typically manufactured by folding the laminate and sealing particular laminate regions. By virtue of this mode of production, the variety of shapes of these containers is limited. For instance, the laminates cannot be folded to an unlimited degree without losing their tightness. Moreover, round containers, for example bottles, can typically be produced only with difficulty from these laminates, for example through the use of additional container components such as a separate container base made of plastic. Moreover, opening aids or additional tools are required for opening of these containers as well. Since the laminates used are typically foldable but have a certain flexibility, the laminate containers are essentially dimensionally stable, but not as stiff and rigid as glass bottles, for example. This leads to disadvantages in stackability and also on pouring. As already set out, the laminates typically consist of a number of mutually bonded layers comprising different polymers and often also aluminum. Such multilayer constructions entail some complexity in recycling. In the prior art, the drive to improve the laminate containers led to ever more complex layer constructions with numerous different materials and material mixtures. The multitude of polymers used is considered to be disadvantageous here, for environmental reasons for example.

In the light of the urgent need for a very environmentally friendly dimensionally stable food or drink product container having maximum freedom in the choice of shape, the containers of the invention open up a new category of containers. Rather than further developing the highly modern and increasingly complex laminate containers, the inventors have concentrated on an environmentally friendly starting material that has not been considered to date for manufacture of containers, especially bottles, for free-flowing food or drink products. Thus, this material obtained from wood via pulp has been known to date merely for egg cartons, i.e. for non-free-flowing food or drink products. The fact that this environmentally friendly material made from renewable raw materials has already long been known for egg cartons and has not been considered to date for development for the use of the invention shows that a completely new strand of development has been opened up here, overcoming established technical prejudices. It will be apparent that the production method for egg cartons cannot simply be applied to the production of the containers of the invention. Instead, a completely different method has been developed for the purpose. Numerous aspects should also be noted here, which unexpectedly allow the production of particularly advantageous containers, especially bottles. Some of these aspects are indicated in the context of the invention.

In general terms, it is an object of the present invention to at least partly overcome a disadvantage that arises from the prior art. It is a further object of the invention to provide a bottle which is as environmentally friendly as possible for free-flowing food or drink products. The bottle here preferably consists to a maximum possible degree of renewable raw materials. Moreover, the bottle is preferably very easily recyclable.

It is also an object of the invention to provide a bottle which is as environmentally friendly as possible for liquid food or drink products, the processing of which on a filling machine leads to a minimum number of processing defects. It is a further object of the invention to provide a bottle which is as environmentally friendly as possible for free-flowing food or drink products having a shaped mouth region that provides a bottle opening, wherein the mouth region has been shaped very cleanly and especially does not comprise any burr or any squeeze bulge. Moreover, the mouth region has preferably been shaped to include a holder ring on which the bottle can be held in a filling machine for transporting and filling. As a result, the bottle of the invention can be processed particularly easily in a standard filling machine. It is a further object of the invention to provide a bottle which is as environmentally friendly as possible for free-flowing food or drink products, wherein the bottle opening can be sealed tight by heat sealing with a minimum amount of sealant. It is a further object of the invention to provide a bottle which is as environmentally friendly as possible for free-flowing food or drink products that features improved tactile properties when drinking directly from the bottle. It is a further object of the invention to provide a bottle which is as environmentally friendly as possible and has good stackability, preferably without additional secondary packaging, for free-flowing food or drink products. For this purpose, the bottle of the invention preferably has maximum mechanical stability, especially to compression. It is a further object of the invention to provide a bottle for free-flowing food or drink products that has a minimum level of water absorption and at the same time is as environmentally friendly as possible, preferably through the use of a minimum level of chemical additions in bottle production. It is also an object of the invention to provide a bottle for free-flowing food or drink products that has minimum intrinsic weight. It is a further object of the invention to provide a bottle for free-flowing food or drink products that can be manufactured in a very wide variety of different shapes. In addition, it is an object of the invention to provide a bottle for free-flowing food or drink products of very simple construction. It is a basic requirement of a bottle for free-flowing food or drink products that it has a minimum degree of watertightness. It is an object of the invention to achieve this watertightness over a maximum possible area and at the same time to preferably minimize the intrinsic weight of the bottle. More particularly, the bottle here should preferably be as environmentally friendly as possible, preferably through the use of a minimum level of chemical additives in the bottle production.

It is a further object of the invention to provide a method of producing a bottle which is as environmentally friendly as possible for free-flowing food or drink products, wherein the method is of maximum simplicity. It is a further object of the invention to provide a method of producing a bottle which is as environmentally friendly as possible for free-flowing food or drink products, wherein the method is notable for minimum evolution of dust. It is a further object of the invention to provide a method of producing a bottle which is as environmentally friendly as possible for free-flowing food or drink products, wherein the method has a minimum maintenance requirement of machines used.

A contribution to the at least partial achievement of at least one, preferably a combination of two or more, of the above objects is made by the independent claims. The dependent claims provide preferred embodiments which contribute to the at least partial achievement of at least one of the objects.

A contribution to the achievement of at least one of the objects of the invention is made by an embodiment 1 of a method 1 comprising, as method steps,
  a) providing a container blank comprising a blank wall at least partly surrounding a blank interior, comprising
    i) a multitude of particles, and
    ii) a liquid in a first proportion of liquid; and
  b) shaping the container blank thereby obtaining a container comprising a container wall which at least partly surrounds a container interior and comprises a container layer comprising
    i) the particles of the multitude of particles, and
    ii) the liquid in a further proportion of liquid;
wherein the further proportion of liquid is less than the first proportion of liquid. The first proportion of liquid is reported here in % by weight and is based on the total weight of the blank wall. The further proportion of liquid is reported here in % by weight and is based on the total weight of the container layer of the container wall. The container layer is specifically the layer of the container wall that comprises the particles of the multitude of particles and is preferably obtained in method step b) from the blank wall. Preferably, the shaping in method step b) comprises separating of a portion of the liquid from the blank wall. Accordingly, the container layer in method step b) comprises only some of the liquid from the blank wall in method step a). Preferably, the further proportion of liquid is less than the first proportion of liquid by a value within a range from 50% to 97% by weight, more preferably from 50% to 90% by weight, more preferably from 50% to 85% by weight, more preferably from 60% to 85% by weight, most preferably from 65% to 85% by weight. The container blank is preferably in one-piece form. A preferred liquid is water. However, a useful liquid, aside from water, is any other liquid that seems suitable to the person skilled in the art for the use of the invention. The method of the invention is preferably performed with the apparatus of the invention.

The blank wall preferably has an average density within a range from 0.1 to 0.8 $g/cm^3$, more preferably from 0.1 to 0.7 $g/cm^3$,—more preferably from 0.1 to 0.6 $g/cm^3$, yet more preferably from 0.1 to 0.5 $g/cm^3$, yet more preferably from 0.1 to 0.4 $g/cm^3$, most preferably from 0.1 to 0.3 $g/cm^3$. The container layer preferably has an average density within a range from 0.4 to 2.0 $g/cm^3$, preferably from 0.4 to 1.8 $g/cm^3$, more preferably from 0.4 to 1.6 $g/cm^3$, more preferably from 0.4 to 1.4 $g/cm^3$, more preferably from 0.4 to 1.2 $g/cm^3$, more preferably from 0.4 to 1.0 $g/cm^3$, yet more preferably from 0.5 to 0.9 $g/cm^3$, most preferably from 0.6 to 0.8 $g/cm^3$.

In one embodiment 2 of the invention, the method 1 is configured according to its embodiment 1, wherein the further proportion of liquid is less than the first proportion of liquid within a range from 50% to 100% by weight, more preferably from 45% to 90% by weight, more preferably from 50% to 85% by weight, more preferably from 55% to 80% by weight, even more preferably from 60% to 75% by weight, most preferably from 65% to 70% by weight, in each case of the first proportion of liquid.

In one embodiment 3 of the invention, the method 1 is configured according to its embodiment 1 or 2, wherein the first proportion of liquid is within a range from 50% to 97% by weight, more preferably from 50% to 90% by weight, more preferably from 60% to 90% by weight, more preferably from 70% to 85% by weight, most preferably from 65% to 80% by weight, based in each case on the weight of the container blank.

In one embodiment 4 of the invention, the method 1 is configured according to any of its preceding embodiments, wherein the container blank in method step a) has a height; wherein the shaping in method step b) comprises reducing the height of the container blank. The height of the container blank is preferably a greatest extent of the container blank in any Cartesian spatial direction. Further preferably, the height of the container blank extends from the blank opening to a section of the blank wall opposite the blank opening, which is preferably a base of the container blank.

In one embodiment 5 of the invention, the method 1 is configured according to its embodiment 4, wherein the height of the container blank is reduced in method step b) to a value within a range from 50% to 99.9%, preferably from 50% to 99.5%, more preferably from 50% to 99.0%, more preferably from 50% to 98.5%, more preferably from 60% to 98.5%, more preferably from 70% to 98.5%, more preferably from 80% to 98.5%, even more preferably from 90% to 98.5%, most preferably from 90% to 98%, in each case of the height of the container blank in method step a).

In one embodiment 6 of the invention, the method 1 is configured according to its embodiment 4 or 5, wherein the reducing of the height of the container blank in method step b) comprises pressing the container blank in lengthwise direction.

In one embodiment 7 of the invention, the method 1 is configured according to its embodiment 6, wherein the container blank is pressed in lengthwise direction in method step b) with a pressure within range from 200 to 10 000 $kN/m^2$, preferably from 500 to 8000 $kN/m^2$, more preferably from 1000 to 5000 $kN/m^2$, based on a maximum cross-sectional area of the container blank in a plane perpendicular to the height of the container blank.

In one embodiment 8 of the invention, the method 1 is configured according to any of its embodiments 4 to 7, wherein the blank interior in method step a) has a maximum diameter in a plane perpendicular to a height of the container interior, where the shaping in method step b) additionally comprises changing this maximum diameter. A preferred mode of changing here is an enlargement. For this purpose, the blank wall in method step b) is preferably pressed outward from the blank interior.

In one embodiment 9 of the invention, the method 1 is configured according to its embodiment 8, wherein the changing of the maximum diameter of the blank interior in method step b) comprises pressing the container blank in the plane perpendicular to the height of the blank interior. Preferably, the container blank here is pressed in every plane through the container blank perpendicular to the height of the blank interior.

In one embodiment 10 of the invention, the method 1 is configured according to any of its preceding embodiments, wherein the blank wall comprises
 A) a mouth region that forms a blank opening of the container blank,
 B) a base, and
 C) a shell surface that connects the mouth region to the base,
wherein the shell surface is pressed in method step b) in the direction of its thickness with a pressure within a range from 200 to 10 000 $kN/m^2$, preferably from 500 to 8000 $kN/m^2$, more preferably from 1000 to 5000 $kN/m^2$.

In one embodiment 11 of the invention, the method 1 is configured according to any of its preceding embodiments, wherein the container blank is introduced into a negative mold of at least part of the container prior to method step b).

In one embodiment 12 of the invention, the method 1 is configured according to its embodiment 11, wherein the blank wall comprises a mouth region that forms a blank opening of the container blank, wherein the method, after the container blank has been introduced into the negative mold, comprises contacting the mouth region of the container blank with a shaping tool, wherein the shaping tool and the negative mold move toward one another in relative terms in the direction of a height of the container blank for the contacting. Preferably, the mouth region of the container blank is at least partly accommodated by the shaping tool in the contacting.

In one embodiment 13 of the invention, the method 1 is configured according to any of its preceding embodiments, wherein the blank wall comprises a mouth region that forms a blank opening of the container blank, wherein the shaping in method step b) comprises shaping the mouth region of the container blank thereby obtaining a mouth region of the container that forms a container opening of the container, wherein the shaping of the mouth region of the container blank in method step b) comprises contacting the blank wall in the mouth region with a shaping tool, wherein the contacting with the shaping tool comprises accommodating the blank wall in the mouth region between an outer ring of the shaping tool and an inner ring of the shaping tool. The outer ring is preferably in one-piece form. Additionally or alternatively, the inner ring is preferably in one-piece form. In the shaping tool, the inner ring is preferably arranged within the outer ring. Accordingly, the outer ring preferably frames the inner ring. Further preferably, the inner ring is arranged concentrically within the outer ring. A ring may have a circular shape or else a shape different from the circular shape. In addition, the inner ring may have the same shape or a shape different from the outer ring, in each case with different diameters. The outer ring and the inner ring preferably have identical geometric shapes. The inner ring preferably has an external diameter less than the internal diameter of the outer ring. Further preferably, the inner ring has an outer circumference less than the inner circumference of the outer ring. In addition, the geometric shape of the inner circumference may differ from that of the outer circumference for the inner ring and the outer ring. The geometric shape of the inner circumference of the outer ring here preferably defines a shape of a surface of the container layer in the mouth region of the container which is remote from the container interior. In addition, the geometric shape of the outer circumference of the inner ring preferably defines a shape of a surface of the container layer in the mouth region of the container which faces the container interior and hence a shape of the container opening.

In one embodiment 14 of the invention, the method 1 is configured according to its embodiment 13, wherein the outer ring in method step b) encloses the blank wall in the mouth region of the container blank around an outer circumference of the mouth region. Additionally or alternatively, the inner ring in method step b) preferably engages with the blank interior and contacts the blank wall in the mouth region of the container blank along an inner circumference of the mouth region of the container blank.

In one embodiment 15 of the invention, the method 1 is configured according to its embodiment 13 or 14, wherein the blank wall in method step b) is shaped in the mouth region between the outer ring and the inner ring. For this purpose, the blank wall is preferably pressed between the outer ring and the inner ring. The shaping of the blank wall in the mouth region preferably comprises a reduction in a proportion of the liquid.

In one embodiment 16 of the invention, the method 1 is configured according to any of its embodiments 13 to 15, wherein the blank wall in its mouth region comprises an edge surrounding the blank opening, wherein the shaping tool in method step b) additionally surrounds the edge. The edge here is preferably contacted with the inner ring.

In one embodiment 17 of the invention, the method 1 is configured according to any of its embodiments 13 to 16, wherein the inner ring is arranged and designed so as to be elastically deformable with respect to the outer ring in the shaping tool. For this purpose, the outer ring may be stiffer than the inner ring. Alternatively or additionally, the outer ring may be in a supported arrangement such that the inner ring is elastically deformable with respect to the outer ring. Preferably, the inner ring has a modulus of elasticity within a range from 1 to 50 MPa, more preferably from 1.7 to 40 MPa, most preferably from 3.5 to 20 MPa. Additionally or alternatively, the outer ring preferably has a first hardness and the inner ring a further hardness, where the first hardness differs from the further hardness. Preferably, the first hardness here is more than the further hardness. Preferably, the further hardness is within a range from 30 to 100 Shore A, more preferably from 40 to 100 Shore A, more preferably from 50 to 100 Shore A, even more preferably from 60 to 100 Shore A, most preferably from 60 to 90 Shore A. The inner ring preferably consists of a polymer, more preferably of an elastomer. Further preferably, the inner ring consists of a poly(organo)siloxane. A preferred poly(organo)siloxane is a silicone rubber or a silicone elastomer or both. The outer ring preferably consists of a metal, more preferably of aluminum, even more preferably of unhardened aluminum.

In one embodiment 18 of the invention, the method 1 is configured according to any of its preceding embodiments, wherein the particles of the multitude of particles are fibers.

In one embodiment 19 of the invention, the method 1 is configured according to its embodiment 18, wherein the fibers are plant fibers.

In one embodiment 20 of the invention, the method 1 is configured according to its embodiment 18 or 19, wherein the fibers comprise, preferably consist of, a chemical pulp or a mechanical pulp or both.

In one embodiment 21 of the invention, the method 1 is configured according to any of its preceding embodiments, wherein the blank wall in method step a) has an average blank wall thickness, wherein the container layer in method step b) has an average container layer thickness, wherein the average container layer thickness is less than the average blank wall thickness. Preferably, the average container layer thickness in method step b) is less than the average blank wall thickness in method step a) by a factor within a range from 1/7 to 1/2, preferably from 1/6 to 1/2, more preferably from 1/6 to 1/3, most preferably from 1/6 to 1/4. The average blank wall thickness in method step a) is preferably within a range from 1000 to 6000 μm, more preferably from 1500 to 5000 μm, most preferably from 2000 to 3000 μm. The average container layer thickness in method step b) is preferably within a range from 100 to 2000 μm, more preferably from 200 to 1900 μm, most preferably from 300 to 1800 μm.

In one embodiment 22 of the invention, the method 1 is configured according to any of its preceding embodiments, wherein the container wall has a container opening, wherein the container interior
  I) has a maximum diameter in a plane perpendicular to a height of the container interior, and
  II) has a diameter less than the maximum diameter of the container interior at least in sections in the direction from the plane to the container opening.

The height of the container interior is preferably a greatest extent of the container interior in any Cartesian spatial direction. Further preferably, the height of the container interior extends from the container opening to a section of the container wall opposite the container opening, which is preferably a base of the container. Additionally or alternatively, the blank wall has a blank opening, where the blank interior has a maximum diameter in a plane perpendicular to a height of the blank interior, where the blank interior has a diameter less than the maximum diameter of the blank interior at least in sections in the direction from the plane to the blank opening. The height of the blank interior is preferably a greatest extent of the blank interior in any Cartesian spatial direction. Further preferably, the height of the blank interior extends from the blank opening to a section of the blank wall opposite the blank opening, which is preferably a base of the container blank.

In one embodiment 23 of the invention, the method 1 is configured according to its embodiment 22, wherein the container layer does not comprise any fold or any crease.

In one embodiment 24 of the invention, the method 1 is configured according to any of its preceding embodiments, wherein the container layer has an average thickness within a range from 100 to 2000 µm, preferably from 150 to 1800 µm, more preferably from 200 to 1500 µm, even more preferably from 250 to 1300 µm, most preferably from 300 to 1000 µm.

In one embodiment 25 of the invention, the method 1 is configured according to any of its preceding embodiments, wherein the method is a method of producing the container. A preferred container is a food or drink product container. A further preferred container is a bottle.

In one embodiment 26 of the invention, the method 1 is configured according to any of its preceding embodiments, wherein the further proportion of liquid is within a range from 0% to 25% by weight, preferably from 0% to 20% by weight, more preferably from 3% to 20% by weight, most preferably from 5% to 15% by weight, based on the weight of the container layer.

In one embodiment 27 of the invention, the method 1 is configured according to any of its preceding embodiments, wherein the blank wall in method step a) additionally comprises hydrophobizing agents or a flow agent or both. Preferably, the container layer also comprises the hydrophobizing agent or a flow agent or both.

In one embodiment 28 of the invention, the method 1 is configured according to any of its preceding embodiments, wherein the shaping in method step b) comprises increasing a temperature of the blank wall. The aforementioned increase is preferably to a temperature of the blank wall within a range from 10 to 300° C., more preferably from 20 to 300° C., more preferably from 30 to 300° C., more preferably from 50 to 300° C., more preferably from 100 to 260° C., more preferably from 120 to 230° C., most preferably from 160 to 200° C.

In one embodiment 29 of the invention, the method 1 is configured according to any of its embodiments 11 to 28, wherein the negative mold comprises a mold wall at least partly surrounding a mold interior, wherein the mold wall at least in parts
  I. is permeable to the liquid, and
  II. is less permeable, preferably impermeable, to the particles of the multitude of particles compared to the liquid.

In one embodiment 30 of the invention, the method 1 is configured according to any of its embodiments 11 to 29, wherein the mold interior has a maximum diameter in a plane perpendicular to a height of the mold interior, where the mold interior has a diameter less than the maximum diameter of the mold interior at least in sections in the direction from the plane to the mold opening. The height of the mold interior is preferably a greatest extent of the mold interior in any Cartesian spatial direction. Further preferably, the height of the mold interior extends from the mold opening to a section of the mold wall opposite the mold opening, which is preferably a base of the mold interior.

In one embodiment 31 of the invention, the method 1 is configured according to its embodiment 29 or 30, wherein method step b) comprises increasing a pressure in the mold interior, such that the container blank is pressed outward against the mold wall.

In one embodiment 32 of the invention, the method 1 is configured according to its embodiment 31, wherein the increasing of the pressure in the mold interior in method step b) is an increase in a fluid pressure in the mold interior. For this purpose, a fluid is preferably introduced into the mold interior. This fluid preferably has a temperature within a range from 10 to 300° C., more preferably from 20 to 300° C., more preferably from 30 to 300° C., more preferably from 50 to 300° C., more preferably from 100 to 260° C., more preferably from 120 to 230° C., most preferably from 160 to 200° C. A preferred fluid here is a gas or a liquid. A preferred gas is air. A preferred liquid is an oil.

In one embodiment 33 of the invention, the method 1 is configured according to any of its embodiments 29 to 32, wherein method step b) comprises contacting the container blank with a solid body on a side remote from the mold wall. In this case, the container blank is preferably pressed between the solid body and the mold wall.

In one embodiment 34 of the invention, the method 1 is configured according to its embodiment 33, wherein the solid body is a hollow body, wherein the increasing of the pressure in method step b) is an increase in a pressure within the hollow body. For this purpose, fluid is preferably introduced into the hollow body. This fluid preferably has a temperature within a range from 10 to 300° C., more preferably from 20 to 300° C., more preferably from 30 to 300° C., more preferably from 50 to 300° C., more preferably from 100 to 260° C., more preferably from 120 to 230° C., most preferably from 160 to 200° C. The hollow body preferably comprises an elastically deformable wall. The elastically deformable wall is preferably pressed against the container blank in method step b), such that it is pressed against the mold wall. As a result, the container blank is pressed between the hollow body and the mold wall.

In one embodiment 35 of the invention, the method 1 is configured according to its embodiment 33 or 34, wherein the solid body in method step b) is at a temperature within a range from 10 to 300° C., more preferably from 20 to 300° C., more preferably from 30 to 300° C., more preferably from 50 to 300° C., more preferably from 100 to 260° C., more preferably from 120 to 230° C., most preferably from 160 to 200° C.

In one embodiment 36 of the invention, the method 1 is configured according to any of its preceding embodiments, wherein the method further comprises at least partly superimposing the container layer with an inner polymer layer on a side of the container layer facing the container interior. The aforementioned superimposing is preferably effected after method step b).

In one embodiment 36 of the invention, the method 1 is configured according to any of its preceding embodiments, wherein the method further comprises at least partly superimposing the container layer with an outer polymer layer on a side of the container layer remote from the container interior. The aforementioned superimposing is preferably affected after method step b).

A contribution to the achievement of at least one of the objects of the invention is made by an embodiment 1 of a container 1 obtainable by the process 1 according to any of its embodiments 1 to 37. The container 1 of the invention, in a preferred embodiment, has the features of the container 2 of the invention according to any of its embodiments.

A contribution to the achievement of at least one of the objects of the invention is made by an embodiment 1 of a container 2 comprising a container wall partly surrounding a container interior; wherein the container wall
  A. has a container opening, and
  B. comprises a container layer;

wherein the container layer comprises
 I) a multitude of particles, and
 II) no fold and no crease;
wherein the container interior
 a. has a maximum diameter in a plane perpendicular to a height of the container interior, and
 b. has a diameter less than the maximum diameter of the container interior at least in sections in the direction from the plane to the container opening.

The height of the container interior is preferably a greatest extent of the container interior in any Cartesian spatial direction. Further preferably, the height of the container interior extends from the container opening to a section of the container wall opposite the container opening, which is preferably a base of the container.

In one embodiment 2 of the invention, the container 2 is configured according to its embodiment 1, wherein the container layer has an average thickness within a range from 100 to 2000 μm, preferably from 150 to 1800 μm, more preferably from 200 to 1500 μm, even more preferably from 250 to 1300 μm, most preferably from 300 to 1000 μm.

In one embodiment 3 of the invention, the container 2 is configured according to its embodiment 1 or 2, wherein the container wall comprises a mouth region that forms the container opening, wherein the container wall does not comprise any burr in the mouth region on a side remote from the container interior. A burr here is a usually linear material thickening that typically results from material displacement, for example by squeezing of the material between moldings. Such a burr is a production fault that typically disrupts an intended shape of the container and can have an adverse effect on perception on the lips in the mouth region of the container when drinking directly from the container. Moreover, a burr can have such an adverse effect on the shape of the container in the mouth region that joining of the container to a closure is made more difficult. A burr can further have such an adverse effect on the shape of the container in the mouth region that there are faults in processing of the container in a filling machine. Moreover, a burr on the edge of the mouth region that surrounds the container opening can make it difficult for the container opening to be tightly sealed with a seal or necessitate the use of a greater amount of sealant for the purpose.

In one embodiment 4 of the invention, the container 2 is configured according to any of its embodiments 1 to 3, wherein the particles of the multitude of particles are fibers.

In one embodiment 5 of the invention, the container 2 is configured according to its embodiment 4, wherein the fibers are plant fibers.

In one embodiment 6 of the invention, the container 2 is configured according to its embodiment 4 or 5, wherein the fibers comprise, preferably consist of, a chemical pulp or a mechanical pulp or both.

In one embodiment 7 of the invention, the container 2 is configured according to any of its embodiments 1 to 6, wherein the container layer comprises solids in a proportion within a range from 50% to 99.9% by weight, more preferably from 60% to 99% by weight, more preferably from 70% to 99% by weight, more preferably from 75% to 99% by weight, more preferably from 80% to 99% by weight, more preferably from 85% to 99% by weight, even more preferably from 90% to 97% by weight, most preferably from 91% to 95% by weight, based in each case on the weight of the container layer. The solids preferably comprise the particles of the multitude of particles or are the particles of the multitude of particles.

In one embodiment 8 of the invention, the container 2 is configured according to any of its embodiments 1 to 7, wherein the container layer does not have an uncompressed surface on a side remote from the container interior or on a side facing the container interior or on either. Preferably, the container layer additionally or alternatively does not have an uncompressed surface on any edge that connects the side of the surface of the container layer facing the container interior to the side of the surface of the container layer remote from the container interior. Preferably, the container layer does not have an uncompressed surface anywhere. Preferably, the container layer does not comprise any cut surface as an uncompressed surface. A cut surface is typically rougher than a compressed surface. Moreover, cut surfaces of the container layer often have fibers that protrude from the cut surface. In addition, a cut surface typically has a greater tendency to absorb a liquid, for example water or else a polymer melt, than a compressed surface of the same container layer.

In one embodiment 9 of the invention, the container 2 is configured according to any of its embodiments 1 to 8, wherein the container wall additionally comprises an inner polymer layer, wherein the inner polymer layer superimposes the container layer at least partly on a side of the container layer facing the container interior.

In one embodiment 10 of the invention, the container 2 is configured according to any of its embodiments 1 to 9, wherein the container wall additionally comprises an outer polymer layer, wherein the outer polymer layer superimposes the container layer at least partly on a side of the container layer remote from the container interior.

In one embodiment 11 of the invention, the container 2 is configured according to any of its embodiments 1 to 10, wherein the container layer is at no point thinner than 100 μm, preferably than 150 μm, more preferably than 200 μm, more preferably than 250 μm, more preferably than 300 μm, more preferably than 400 μm, even more preferably than 450 μm, most preferably than 500 μm. The lack of such thin parts in the container layer increases the mechanical stability of the container, especially against compressions.

In one embodiment 12 of the invention, the container 2 is configured according to any of its embodiments 1 to 11, wherein the container has a compressive strength within a range from 100 to 250 N, preferably from 150 to 250 N.

In one embodiment 13 of the invention, the container 2 is configured according to any of its embodiments 1 to 12, wherein the container wall has a water vapor permeation rate within a range from 0.009 to 0.14 g of water per $cm^2$ of container wall and year, preferably from 0.026 to 0.12 g of water per $cm^2$ of container wall and year, more preferably from 0.043 to 0.11 g of water per $cm^2$ of container wall and year.

In one embodiment 14 of the invention, the container 2 is configured according to any of its embodiments 1 to 13, wherein the container layer additionally comprises a hydrophobizing agent or a flow agent or both. The hydrophobizing agent or the flow agent is, or both are, preferably in solid form. Further preferably, the hydrophobizing agent or the flow agent is, or both are, bonded to the particles of the multitude of particles.

In one embodiment 15 of the invention, the container 2 is configured according to any of its embodiments 1 to 14, wherein the container opening has been covered with a closure. The container here is accordingly preferably a closed container.

In one embodiment 16 of the invention, the container 2 is configured according to any of its embodiments 1 to 15, wherein the container interior comprises a fluid.

In one embodiment 17 of the invention, the container 2 is configured according to any of its embodiments 1 to 16, wherein the container layer has an average density within a range from 0.4 to 2.0 g/cm$^3$, preferably from 0.4 to 1.8 g/cm$^3$, more preferably from 0.4 to 1.6 g/cm$^3$, more preferably from 0.4 to 1.4 g/cm$^3$, more preferably from 0.4 to 1.2 g/cm$^3$, more preferably from 0.4 to 1.0 g/cm$^3$, even more preferably from 0.5 to 0.9 g/cm$^3$, most preferably from 0.6 to 0.8 cm$^3$.

In a further embodiment of the invention, the container 2 is configured according to any of its embodiments 1 to 17, wherein the container layer does not have an average arithmetic height of more than 15 μm, preferably more than 10 μm, more preferably more than 5 μm, most preferably more than 3 μm, on a side remote from the container interior or on a side facing the container interior or on either. Preferably, the container layer additionally or alternatively does not have an average arithmetic height of more than 15 μm, preferably more than 10 μm, more preferably more than 5 μm, most preferably more than 3 μm, on any edge that connects the side of the surface of the container layer facing the container interior to the side of the surface of the container layer remote from the container interior. More preferably, the container layer does not have an average arithmetic height of more than 15 μm, preferably more than 10 μm, more preferably more than 5 μm, most preferably more than 3 μm, at any point.

A contribution to the achievement of at least one of the objects of the invention is made by an embodiment 1 of a method 2 comprising, as method steps,
I) providing the container 1 or 2, in each case according to any of its embodiments;
II) filling the container with a fluid; and
III) closing the container by joining the container to a closure.

Method steps II) and III) are preferably conducted in a filling machine. Before method step II), the container is preferably at least partly sterilized, preferably on the surface of the container wall facing the container interior.

In one embodiment 2 of the invention, the method 2 is configured according to its embodiment 1, wherein the closure is sealed to the container. Preferably, the closure is sealed to the container by means of the outer polymer layer or the inner polymer layer or both as sealant.

A contribution to the achievement of at least one of the objects of the invention is made by an embodiment 1 of a closed container obtainable by the method 2 according to its embodiment 1 or 2. The closed container of the invention, in a preferred embodiment, has the features of the container 2 of the invention according to any of its embodiments.

A contribution to the achievement of at least one of the objects of the invention is made by an embodiment 1 of an apparatus comprising a negative mold of a container, wherein the negative mold comprises a mold wall partly surrounding a mold interior, wherein the mold wall at least in parts
a. is permeable to a liquid, and
b. is less permeable to particles of a multitude of particles compared to the liquid,
wherein the container comprises a container wall partly surrounding the container interior,
wherein the container wall
A. has a container opening, and
B. comprises a container layer comprising the multitude of particles,
wherein the container interior
I) has a maximum diameter in a plane perpendicular to a height of the container interior, and
II) has a diameter less than the maximum diameter of the container interior at least in sections in the direction from the plane to the container opening.

Preferably, the container here is the container 2 of the invention according to any of its embodiments. A preferred liquid here is water. The further mold wall is preferably permeable to liquid and impermeable to the particles of the multitude of particles. A preferred apparatus is an apparatus for producing the container. Preferably, the mold wall has a mold opening that connects the mold interior to an environment of the negative mold, wherein the mold interior has a maximum diameter in a plane perpendicular to a height of the mold interior, wherein the mold interior has a diameter less than the maximum diameter of the mold interior at least in sections in the direction from the plane to the mold opening. The apparatus of the invention is preferably a hot pressing apparatus.

In one embodiment 2 of the invention, the apparatus is configured according to its embodiment 1, wherein the container is obtainable from a container blank, wherein the container blank comprises a blank wall that at least partly surrounds a blank interior, comprising
i) the multitude of particles, and
ii) the liquid,
where the negative mold is designed to accommodate the container blank in the mold interior. The container layer of the container is preferably obtainable from the container blank.

In one embodiment 3 of the invention, the apparatus is configured according to its embodiment 2, wherein the apparatus additionally comprises a shaping tool, wherein the shaping tool and the negative mold are arranged so as to be movable relative to one another, such that the container blank can be pressed along its height between the shaping tool and the negative mold. Preferably, the shaping tool is designed as described in any embodiment of the method 1 of the invention.

In one embodiment 4 of the invention, the apparatus is configured according to its embodiment 3, wherein the blank wall comprises a mouth region that forms a blank opening of the container blank, wherein the shaping tool is designed to contact the blank wall in its mouth region.

In one embodiment 5 of the invention, the apparatus is configured according to its embodiment 4, wherein the shaping tool is designed to at least partly accommodate the blank wall in the mouth region.

In one embodiment 6 of the invention, the apparatus is configured according to its embodiment 4 or 5, wherein the container wall comprises a mouth region that forms the container opening of the container, wherein the shaping tool is designed to shape the mouth region of the container from the mouth region of the container blank.

In one embodiment 7 of the invention, the apparatus is configured according to its embodiment 2, wherein the blank wall comprises a mouth region that forms a blank opening of the container blank, wherein the container wall comprises a mouth region that forms the container opening of the container, wherein the apparatus additionally comprises a shaping tool, wherein the shaping tool is designed to shape the mouth region of the container from the mouth region of the container blank. Preferably, the shaping tool is set up as described in any embodiment of the method 1 of the invention.

In one embodiment 8 of the invention, the apparatus is configured according to its embodiment 7, wherein the shaping tool comprises an inner ring and an outer ring that surrounds the inner ring, wherein the shaping tool is set up to accommodate the blank wall in the mouth region at least partly between the outer ring and the inner ring.

In one embodiment 9 of the invention, the apparatus is configured according to its embodiment 8, wherein the blank wall comprises an edge surrounding the blank opening in the mouth region, wherein the shaping tool is additionally set up to accommodate the blank wall in the mouth region at least partly between the outer ring and the inner ring, in such a way that the shaping tool surrounds the edge.

In one embodiment 10 of the invention, the apparatus is configured according to its embodiment 8 or 9, wherein the inner ring is arranged and designed so as to be elastically deformable with respect to the outer ring in the shaping tool. For this purpose, the outer ring may be stiffer than the inner ring. Alternatively or additionally, the outer ring may be in a supported arrangement such that the inner ring is elastically deformable with respect to the outer ring. Preferably, the inner ring has a modulus of elasticity within a range from 1 to 50 MPa, more preferably from 1.7 to 40 MPa, most preferably from 3.5 to 20 MPa. Additionally or alternatively, the outer ring preferably has a first hardness and the inner ring a further hardness, where the first hardness differs from the further hardness. Preferably, the first hardness here is more than the further hardness. Preferably, the further hardness is within a range from 30 to 100 Shore A, more preferably from 40 to 100 Shore A, more preferably from 50 to 100 Shore A, even more preferably from 60 to 100 Shore A, most preferably from 60 to 90 Shore A. The inner ring preferably consists of a polymer, more preferably of an elastomer. Further preferably, the inner ring consists of a poly(organo)siloxane. A preferred poly(organo)siloxane is a silicone rubber or a silicone elastomer or both. The outer ring preferably consists of a metal, more preferably of aluminum, even more preferably of unhardened aluminum.

In one embodiment 11 of the invention, the apparatus is configured according to any of its embodiments 8 to 10, wherein the outer ring is designed to surround the blank wall in the mouth region around an outer circumference of the mouth region.

In one embodiment 12 of the invention, the apparatus is configured according to any of its embodiments 8 to 11, wherein the shaping tool is designed to shape the mouth region of the container between the outer ring and the inner ring from the mouth region of the container blank.

In one embodiment 13 of the invention, the apparatus is configured according to any of its embodiments 3 to 12, wherein the shaping tool further comprises a solid body designed
A. to at least partly engage with the blank interior,
B. to contact the blank wall on a side facing the blank interior, and
C. to press outward against the blank wall.

Preferably, the solid body is designed to perform the aforementioned steps A. to C. in the contacting of the blank wall in the mouth region, or in the shaping of the mouth region of the container from the mouth region of the container blank, or in both.

In one embodiment 14 of the invention, the apparatus is configured according to its embodiment 13, wherein the solid body is a hollow body, wherein the hollow body comprises an elastically deformable wall. Preferably, the hollow body comprises a fluid inlet for filling the hollow body with a fluid. Preferably, the apparatus further comprises a fluid feed which is arranged and designed to increase a pressure in the hollow body, preferably to increase it in such a way that the container blank is pressed against the mold wall in the mold interior.

In one embodiment 15 of the invention, the apparatus is configured according to any of its embodiments 1 to 14, wherein the negative mold comprises at least one first molding and one further molding, wherein the negative mold is formed in such a way that the negative mold can be opened by separating the first molding from the further molding for demolding. The negative mold here may have been formed, for example, from half-shells which can be separated from one another for the demolding.

In one embodiment 16 of the invention, the apparatus is configured according to any of its embodiments 2 to 15, wherein the apparatus further comprising a fluid feed, wherein the fluid feed is arranged and designed to increase a pressure in the mold interior by supplying a fluid in such a way that the container blank is pressed against the mold wall in the mold interior.

In one embodiment 17 of the invention, the apparatus is configured according to any of its embodiments 1 to 16, wherein the mold wall comprises a multitude of openings that connect the mold interior to an environment of the negative mold.

In one embodiment 18 of the invention, the apparatus is configured according to any of its embodiments 1 to 17, wherein the apparatus further comprises a temperature control device arranged and set up to adjust, preferably to increase, a temperature of one selected from the group consisting of the mold wall, the solid body and the fluid, or a combination of at least two of these, to a temperature within a range from 10 to 300° C., more preferably from 20 to 300° C., more preferably from 30 to 300° C., more preferably from 50 to 300° C., more preferably from 100 to 260° C., more preferably from 120 to 230° C., most preferably from 160 to 200° C. A preferred temperature control device is a heating device.

In one embodiment 19 of the invention, the apparatus is configured according to any of its embodiments 1 to 18, wherein the apparatus further comprises a coating device, wherein the coating device is arranged and designed to superimpose the container layer of the container with a polymer layer. The coating device is preferably arranged downstream of the negative mold. A preferred coating device is a powder coating system.

In one embodiment 20 of the invention, the apparatus is configured according to its embodiment 19, wherein the coating device is arranged and designed to superimpose the container layer on a side of the container layer facing the container interior or on a side of the container layer remote from the container interior or both with the polymer layer.

In one embodiment 21 of the invention, the apparatus is configured according to any of its embodiments 1 to 20, wherein the apparatus is designed to perform the method 1 according to any of its embodiments. Preferably, the apparatus is designed to produce the container from the container blank. More preferably, the apparatus for producing the container 2 of the invention is designed according to any of its embodiments.

A contribution to the achievement of at least one of the objects of the invention is made by an embodiment 1 of a use 1 of a filling machine for filling and closing the container 1 or 2, in each case according to any of its embodiments.

Preferably, the filling machine is used for performance of method 2 of the invention according to any of its embodiments. A filling machine refers here to a machine or automatic system designed to dispense a fluid, preferably a food or drink product or a medicament or both, into a multitude of the containers of the invention. Moreover, the filling machine is preferably designed for closing of the containers after the filling. The filling or closing or both is preferably effected in a very substantially automated manner.

A contribution to the achievement of at least one of the objects of the invention is made by an embodiment 1 of a use 2 of the container 1 or 2 or of the closed container, in each case according to any of its embodiments, for storing a fluid. The storing here is preferably effected at an ambient temperature within a range from 1 to 18° C., more preferably from 3 to 15° C., most preferably from 5 to 15° C. In addition, the storing can be effected here over a long period in a warehouse, or else for offering for sale in a sales space, or for transportation of the container.

A contribution to the achievement of at least one of the objects of the invention is made by an embodiment 1 of a use 3 of the apparatus according to any of its embodiments for producing the container.

A contribution to the achievement of at least one of the objects of the invention is made by an embodiment 1 of a use 4 of a multitude of fibers in a pulp, the pulp comprising the multitude of fibers and a liquid, for producing the container 1 or 2, in each case according to any of its embodiments. A preferred liquid here is water. Preferably, the pulp additionally comprises a hydrophobizing agent or a flow agent or both.

In one embodiment 2 of the invention, the use 4 is configured according to its embodiment 1, wherein the pulp comprises solids and optionally solids-forming additives together in a proportion within a range from 0.1% to 5.0% by weight, preferably from 0.1% to 4.5% by weight, more preferably from 0.1% to 4.0% by weight, more preferably from 0.1% to 3.5% by weight, more preferably from 0.1% to 3.0% by weight, more preferably from 0.1% to 2.5% by weight, more preferably from 0.1% to 2.0% by weight, more preferably from 0.3% to 2.0% by weight, more preferably from 0.3% to 2.0% by weight, more preferably from 0.3% to 1.8% by weight, more preferably from 0.3% to 1.6% by weight, more preferably from 0.5% to 1.6% by weight, more preferably from 0.5% to 1.4% by weight, most preferably from 0.5% to 1.2% by weight, based in each case on the total weight of the pulp. The solids preferably comprise the particles of the multitude of particles or are the particles of the multitude of particles.

Features which are described as preferred in one category of the invention, for example for the container 2, are likewise preferred in an embodiment of the further categories of the invention, for example an embodiment of the method 1 of the invention or of the apparatus.

Container

For the container of the invention, any container form which is known to the person skilled in the art and seems suitable in connection with the invention, especially for food or drink product or medicament containers, is an option in principle. The container of the invention here, especially by virtue of the presence of the container layer, is in dimensionally stable and rigid form. A container is an article having a cavity in its interior that especially serves the purpose of separating its contents from its environment. A vessel is an article having a stiff and rigid shell that may contain contents of different consistency. There is accordingly a fundamental distinction between containers and vessels. A container is preferably relatively impervious to a medium for which it is constructed, but not necessarily to other media. The container of the invention is preferably a container for a fluid. A preferred fluid here is a granular material or a liquid, particular preference being given to a liquid. Moreover, the container of the invention is preferably also a vessel. Preferably, the container wall comprises a container opening. The container opening is preferably arranged and set up to remove some of the contents of the container from the container interior, preferably by pouring out or tipping out or both. In this case, a ratio of an area content of an opening area of the container opening to an area content of an entire surface of the container wall remote from the container interior is preferably within a range from 0.001 to 0.2. Further preferably, the container blank comprises a blank opening from which the container opening is obtainable. In this case, a ratio of an area content of an opening area of the blank opening to an area content of an entire surface of the blank wall remote from the blank interior is within a range from 0.001 to 0.2.

The container of the invention preferably comprises a container wall partly surrounding a container interior, where the container wall has a container opening, where the container interior has a maximum diameter in a plane perpendicular to a height of the container interior, where the container interior has a diameter less than the maximum diameter of the container interior at least in sections in the direction from the plane to the container opening. The height of the container interior is preferably a greatest extent of the container interior in any Cartesian spatial direction. Further preferably, the height of the container interior extends from the container opening to a section of the container wall opposite the container opening, which is preferably a base of the container. Accordingly, the container interior narrows at least in sections in the direction from the plane of the maximum diameter of the container interior toward the container opening.

More preferably, the container of the invention takes the form of a bottle. The container blank preferably also already has the shape of a bottle. According to the above definitions, a bottle is a container for a fluid and simultaneously also a vessel. Bottles typically, but not necessarily, have a relatively small maximum external diameter relative to their height, and a flat base. The base is preferably arranged opposite a bottle opening, which in the case of the bottle as container is the above container opening. The height of the bottle here is preferably more by a factor of at least 2 than a maximum external diameter of the bottle in a plane perpendicular to the height. The flat base is preferably designed to be able to place the bottle on a flat surface in a stable manner. Bottles typically have a bottle body and a mouth region. The bottle body is designed to provide an internal volume to accommodate a fluid. For this purpose, the bottle body preferably forms at least 80% of a volume of the bottle interior. The mouth region forms a bottle opening, which in the case of the bottle as container is the above container opening. In addition, the bottle often but not necessarily comprises a bottle neck that connects the bottle body to the mouth region. The bottle neck is designed to connect the bottle body to the mouth region, such that a fluid can flow out of the bottle body into the mouth region. The bottle neck preferably has a smaller internal diameter at every point than the bottle body, and further preferably also than the mouth region of the bottle. The internal diameter of the mouth region here may be greater than, less than or equal to the maximum internal diameter of the bottle body.

The container wall or container layer or both of the container of the invention is preferably in one-piece form. In this connection, the container wall or container layer or both preferably does not have any joining site. A joining site here is a region in which two or more separate parts are joined to one another within the meaning of standard DIN 8580. For this purpose, the joining site may include a material that has been used as a shapeless substance for the joining. Illustrative shapeless substances are adhesives and sealants. Illustrative modes of joining are adhesive bonding, sealing and compressing. A joining site is often an elongated region that often runs around the circumference of the container in its longitudinal or transverse direction, or along its height, which is also referred to as a seam. Further preferably, the container wall or container layer or both also has no joining site at which a part has been joined to itself. More preferably, the container of the invention takes the form of a bottle, the base or mouth region of which or both has been formed in one piece together with the bottle body thereof. Further preferably, the bottle body as such is in one-piece form. Additionally preferably, the bottle body does not comprise any joining site.

Mouth Region

The container wall preferably comprises a mouth region of the container. This mouth region especially forms an opening, also called container opening herein, of the container. This opening is preferably designed for pouring out or tipping out, or both, contents of the container. In the case of a bottle as container, the bottle body typically merges into the mouth region via a bottle neck. The mouth region in this case is specifically the region of the container wall that forms the opening of the container. Often, the mouth region comprises a thread on a side remote from the container interior for screwing on a lid. In addition, the mouth region may surround the opening in the form of a collar. More particularly, the mouth region of a bottle as container is the region of the container wall that typically comes into contact with the lips when drinking directly from the bottle by placing the lips against the bottle. The mouth region of the container is preferably obtainable from a mouth region of the container blank. It is further preferable here that the container opening is obtainable from a blank opening formed by the blank wall in the mouth region of the container blank.

Container Wall

The container wall of the container of the invention may, in addition to the container layer, comprise further layers, for example polymer layers, for example the inner polymer layer or the outer polymer layer or both. Consequently, the container wall preferably takes the form of a two-layer or multilayer composite comprising at least the container layer and a further layer, preferably a polymer layer, as a layer sequence. A form of words in which a layer sequence comprises enumerated layers means that at least the layers specified are present in the sequence specified. This form of words does not necessarily mean that these layers follow on directly from one another. Unless stated otherwise, in a layer sequence, the layers may follow one another indirectly, i.e. with one or at least two intermediate layers, or directly, i.e. with no intermediate layer. This is the case especially in the form of words in which one layer superimposes another layer. A form of words in which two layers adjoin one another or one of the layers has been coated onto the other means that these two layers follow on from one another directly and hence with no intermediate layer. Moreover, layers coated onto one another have been bonded to one another. Two layers are joined to one another when their adhesion to one another extends beyond van der Waals attraction forces.

Container Layer

The container layer of the container of the invention imparts a rigid shape and mechanical stability thereto. The container layer here essentially defines the shape of the container. The container layer is preferably the layer of the container wall that serves as a stiff and rigid shell that preferably also makes the container of the invention a vessel. Further preferably, the container layer has a metal content of less than 20% by weight, preferably less than 10% by weight, most preferably less than 5% by weight, based in each case on the weight of the container layer. More preferably, the container layer is essentially metal-free. If the container wall comprises at least one further layer in addition to the container layer, the container layer preferably serves as carrier for these further layers of the container wall, especially for the inner polymer layer or else the outer polymer layer or both. Preferably in accordance with the invention, the container layer does not comprise any fold or any crease. Preferably, the container layer at a moisture content of 7% by weight would break in the attempt to fold or to crease this layer by an angle of 90°. Preferably, the container layer extends over the entire surface of the container wall. More preferably, the container layer is in one-piece form. In this connection, the container layer preferably does not have any joining site. More preferably, the container layer is obtained from a pulp as composition, most preferably in one-piece form. For this purpose, the pulp has preferably been at least partly dewatered, shaped, pressed and heated. The container layer preferably has a water absorption within a range from 0% to 20% by weight, preferably from 0% to 15% by weight, more preferably from 0% to 10% by weight, of its dry weight.

Composition/Pulp

A useful composition is any composition that seems suitable to the person skilled in the art for the method of the invention. The composition is preferably fluid, i.e. free-flowing. A preferred fluid composition is a suspension. The composition preferably has a pH within a range from 6 to 8.5, preferably from 7 to 8. A particularly preferred composition is also referred to as a pulp. This is a liquid to slurrylike mass which is known in the paper, paperboard or cardboard industry.

This comprises the multitude of particles, preferably as a multitude of fibers. Accordingly, the pulp is preferably a fiber slurry or a fiber-containing suspension. The slurry or suspension here is preferably aqueous. However, a useful liquid, aside from water, is any other liquid that seems suitable to the person skilled in the art for use in the composition. It is important here that the liquid makes the composition free-flowing.

Particles/Fibers

Useful particles for the multitude of particles in the composition, the container layer and the blank wall include all particles that seem suitable to the person skilled in the art for the use of the invention. The particles are preferably elongated. Preferred particles are fibers. Useful fibers are any fibers that seem suitable to the person skilled in the art for the use of the invention, especially all fibers known in paper, cardboard or paperboard production. Fibers are linear elongate structures that have a ratio of length to diameter or thickness of at least 3:1. For some fibers, the aforementioned ratio is not greater than 10:1. Preferred fibers are plant fibers. Plant fibers is a collective term for fibers of plant origin. In plants, plant fibers occur as a vascular bundle in the stalk or stem, in the bark (for instance in the form of bast) and as seed shoots. A subdivision is made in DIN 60001-1: 2001-05 Textile fibres-Part 1: "Natural fibres and letter codes", Beuth Verlag, Berlin 2001, p. 2 into seed fibers, bast fibers and hard fibers, and in DIN EN ISO 6938: 2015-01 "Textiles-Natural fibres-Generic names and definitions", Beuth Verlag, Berlin 2015, p. 4. into seed fibers, bast fibers, leaf fibers and fruit fibers, which thus implements a division of the hard fibers. Fibers that are preferred in the context of the invention include a chemical pulp or a mechanical pulp or both; the fibers preferably consist thereof. Preferred fibers have an average fiber length within a range from 0.5 to 5 mm, more preferably from 0.5 to 4 mm, more preferably from 1 to 3 mm, most preferably from 1 to 2 mm.

Chemical Pulp

Chemical pulp typically refers to the fibrous mass formed in the chemical digestion of plant fibers that typically consists predominantly of cellulose.

Mechanical Pulp

Mechanical pulp refers to the substance that is typically used for the production of particular types of paper. It is obtained from wood and, unlike chemical pulp, typically contains relatively high proportions of lignin. Mechanical pulp can be detected by staining the lignin present red with phloroglucinol solution in hydrochloric acid and hence distinguished from chemical pulp. Wurster's blue and red (named for Casimir Wurster) and aniline sulfate have frequently also been used for the purpose. The higher lignin content of mechanical pulp can lead to yellowing of the paper in the case of paper (wood-pulp paper) produced from mechanical pulp. The wood from which the mechanical pulp is obtained typically consists mainly of lignocellulose. Lignocellulose consists of cellulose molecules aggregated to form fibers. A matrix of lignin permeates the cellulose, giving rise to a pressure- and tear-resistant composite. In the production of mechanical pulp, the wood is shredded by various methods. Mechanical pulp is produced by mechanical and/or thermal and/or chemical methods of wood digestion. According to these modes of production, a distinction is made between mechanical pulp MP, which is produced by merely mechanical methods of wood digestion; and thermomechanical pulp (TMP), which is produced by wood digestion comprising mechanical and thermal and optionally also chemical steps. The aforementioned methods of wood digestion comprising mechanical and thermal and optionally also chemical steps are also referred to as refiner methods. A preferred thermomechanical pulp is a chemithermomechanical pulp (CTMP). The mechanical methods of wood digestion especially include grinding methods such as wood grinding and pressure grinding. In the context of the invention, preference is given to a mechanical pulp MP. A preferred mechanical pulp MP is a ground wood or a pressure-ground wood or both. Alternatively or additionally preferably, the mechanical pulp has been produced from a soft wood. Soft wood, as opposed to hard wood, refers to lighter wood, for example having an oven-dry density below 0.55 g/cm$^3$ (for example willow, poplar, linden and nearly all coniferous woods). A particularly preferred soft wood is spruce wood. The term soft wood should not be used equivalently to the English term "softwood". "Softwood" has to be translated into German as "Nadelholz" and thus refers primarily to the origin of the wood and merely indirectly to the wood's characteristics because there are also relatively hard coniferous woods.

Polymer Layers

The container wall of the container of the invention may, in addition to the container layer, comprise one or more polymer layers, each of which at least partly superimposes the container layer. For instance, one or more polymer layers may superimpose the container layer on a side remote from the container interior or on a side facing the container interior or on both. Useful polymer layers include layers composed of all polymers and polymer mixtures that are known to the person skilled in the art and seem suitable for the container of the invention and its uses, and mixtures of polymers with further constituents. Method 1 preferably comprises, in its method step b), superimposing of the container layer with one or more of the aforementioned polymer layers. In a preferred embodiment of the method of the invention, an outer polymer layer at least partly superimposes the container layer on a side remote from the container interior. In a preferred embodiment of method 1 of the invention, this method comprises, after method step b), a method step comprising at least partly superimposing the container layer with the outer polymer layer on a side remote from the container interior. In a preferred configuration of the container of the invention, the container comprises the outer polymer layer in a proportion of less than a value within a range from 2% to 15% by weight, preferably from 3% to 12% by weight, more preferably from 4% to 8% by weight, based in each case on the total weight of the container. Additionally or alternatively, the container layer is preferably superimposed by the outer polymer layer, in each case on its surface remote from the container interior, to an extent of 1% to 100%, more preferably to an extent of 1% to 90%, more preferably to an extent of 1% to 80%, more preferably to an extent of 1% to 70%, more preferably to an extent of 1% to 60%, more preferably to an extent of 1% to 50%, even more preferably to an extent of 1% to 40%, to an extent of more preferably from 1% to 30%, to an extent of more preferably from 3% to 20%, most preferably to an extent of 5% to 15%. Additionally or alternatively, the container wall comprises a mouth region that forms the container opening, wherein the container layer is superimposed by the outer polymer layer at least over the entire mouth region on the side remote from the container interior. In a preferred embodiment of the container of the invention, an inner polymer layer at least partly superimposes the container layer on a side facing the container interior. In a preferred embodiment of method 1 of the invention, this method comprises, after method step b), a method step comprising at least partly superimposing the container layer with the inner polymer layer on a side facing the container interior. In a preferred configuration of the container of the invention, the container comprises the inner polymer layer in a proportion within a range from 5% to 45% by weight, preferably from 5% to 40% by weight, more preferably from 5% to 35% by weight, even more preferably from 5% to 30% by weight, most preferably from 10% to 25% by weight, based in each case on the total weight of the container. Additionally or alternatively, the container layer is preferably superimposed by the inner polymer layer, in each case on its surface facing the container interior, to an extent of 50% to 100%, preferably to an extent of 60% to 100%, more preferably to an extent of 70% to 100%, more preferably to an extent of 80% to 100%, even more preferably to an extent of 90% to 100%, most preferably to an extent of 95% to 100%. The inner polymer layer or the outer polymer layer or each of them preferably comprises a polymer in a proportion within a range from 50% to 100% by weight, preferably from 60% to 100% by weight, more preferably from 70% to 100% by weight, even more preferably from 80% to 100% by weight, most preferably from 90% to 100% by weight, based in each case on the weight of the respective polymer layer. The inner polymer layer or the outer polymer layer or each of them preferably has an average layer thickness within a range from 1 to 100 μm, preferably from 10 to 100 μm, more preferably from 20 to 100 μm.

An edge formed by the container wall preferably runs around the container opening of the container of the invention. In the case of a circular container opening, the edge is preferably in the form of a circular ring. The edge cannot be unambiguously assigned to an interior or exterior of the container. It thus remains ambiguous whether this edge faces or is remote from the container interior. Consequently, this edge may be superimposed by the inner polymer layer or the outer polymer layer or even by both. If the container layer is superimposed at the edge with the inner polymer layer or the outer polymer layer or with both, it is preferably possible to join a closure, preferably in the form of a film, by means of the inner polymer layer or the outer polymer layer or both as sealant to the container by sealing.

Polymer

A useful polymer in the above-described polymer layers, especially the inner polymer layer and the outer polymer layer, is any polymer which is known to the person skilled in the art and seems suitable for the use of the invention. The polymer of the inner polymer layer is more preferably suitable for contact with a food or drink product. Polymers that are suitable to the container of the invention sufficient watertightness for storing aqueous liquids in the container over a period of several weeks or even several months are preferred herein. Further preferably, the polymer is coatable onto the container layer by means of a suitable method, for example by emulsion, dispersion or powder coating, such that a very substantially continuous and homogeneous layer is obtained. Particular preference is given here to powder coating. The polymer is preferably one selected from the group consisting of a polycondensate, a polyolefin, and a polyvinyl alcohol, or a combination of at least two of these. A preferred polyolefin is a polyethylene (PE) or a polypropylene (PP) or both. A preferred polycondensate is a polyester or polyamide (PA) or both. A preferred polyester is a polyalkylene terephthalate or a polylactide (PLA, also colloquially called polylactic acid) or both. A preferred polyalkylene terephthalate is a polybutylene terephthalate (PBT) or a polyethylene terephthalate (PET). A preferred polyvinyl alcohol is a vinyl alcohol copolymer. A preferred vinyl alcohol copolymer is an ethylene-vinyl alcohol copolymer (EVOH).

Container Blank

The container 2 of the invention described herein is preferably obtainable from the container blank, preferably by method 1 of the invention, from use 3 or 4. The container blank preferably already essentially has the shape of the container to be produced from the container blank. However, the blank wall of the container blank here preferably does not yet have the stiffness of the container layer of the container obtainable therefrom.

The container blank preferably comprises a blank wall partly surrounding a blank interior, where the blank wall has a blank opening, where the blank interior has a maximum diameter in a plane perpendicular to a height of the blank interior, where the blank interior has a diameter less than the maximum diameter of the blank interior at least in sections in the direction from the plane to the blank opening. The height of the blank interior is preferably a greatest extent of the blank interior in any Cartesian spatial direction. Further preferably, the height of the blank interior extends from the blank opening to a section of the blank wall opposite the blank opening, which is preferably a base of the container blank. Accordingly, the blank interior narrows at least in sections in the direction from the plane of the maximum diameter of the blank interior toward the blank opening. The region of the blank wall that forms the blank opening is also referred to herein as mouth region. The blank wall is preferably in one-piece form. In this connection, the blank wall preferably does not have any joining site. What is meant by a joining site is described above for the container and is analogously applicable here too. More preferably, the container blank takes the form of a bottle, the base or mouth region of which or both has been formed in one piece together with the bottle body thereof. Further preferably, the bottle body as such is in one-piece form. Additionally preferably, the bottle body does not comprise any joining site. Further preferred shapes have been described above for the container.

Fluid

A fluid herein is understood to mean a free-flowing medium. These especially include liquids; gases; and granular materials such as powders or granules; and mixtures of at least two of the above. A preferred fluid which is filled into or stored in the container of the invention is a food or drink product or a medicament or both. A preferred fluid which is introduced into the mold interior or the hollow body is a gas, preferably air, or a liquid, preferably an oil, or both.

Fold/Crease

Creasing is the production of a sharp folded edge called a crease (also crease line or crease break). In the case of creasing, this production is effected with the aid of a tool or a machine. If the folded edge is created without tools, this is referred to as folding and the folded edge is referred to as a fold. Folding or creasing is typically effected along grooves. The folding/creasing typically weakens the mechanical integrity of the corresponding layer along the fold/crease such that regions of the layer adjoining the fold/crease can be moved with respect to one another in the manner of a hinge joint, in that an angle formed by the regions is reduced. The regions come to rest here against one another at an angle of 0°. In the case of a fiber-containing layer, the fibers are typically broken at least partly along the fold/crease. Preferably in accordance with the invention, the container layer does not comprise any fold or any crease.

Closure

A useful closure for the container of the invention or the closed container is any closure which is known to the person skilled in the art and seems suitable for the respective container. The closure here may be in single- or multipart form. The closure is designed to close the container opening of the container. For this purpose, the closure is designed to cover the container opening, and for the container opening to be joined to the container in a covering manner. The joining here can be effected, for example, by screwing, sealing or else compression. A preferred closure comprises a lid. A preferred lid is a screwtop lid or a crown cap or both. Additionally or alternatively, the closure preferably comprises a film. The film preferably consists of a plastic or a metal or both and is further preferably joined to the container, preferably sealed or adhesively bonded or both. The film here may especially consist of a multilayer composite. A preferred lid consists of a plastic or a metal or both.

Powder Coating

Powder coating is a coating method in which a material is coated with a powder, preferably a polymer powder, by means of electrostatic attraction forces. For this purpose, an electrical charge differential is preferably generated between a polymer composition comprising the polymer powder and the container layer. For that purpose, the polymer powder is preferably positively or negatively electrically charged. In addition, the container layer has preferably been contacted for the purpose with a grounded shaped body.

Food or Drink Product

The container of the invention is preferably a food or drink product container. Food and drink products include all kinds of food and drink known to those skilled in the art for human consumption and also animal feeds. A preferred food or drink product is a fluid, i.e. free-flowing. Free-flowing substances are liquids; gases; granular materials, for example powders and granules; and mixtures of at least two of the above. It is also possible here for solids to be present in the liquid, for example but not necessarily forming a suspension. A preferred liquid is a beverage, for example a juice, a nectar, a milk product or a soft drink. A further preferred liquid is a sauce or a soup. The abovementioned liquids are preferably in the liquid state of matter above 5° C.

Hydrophobizing Agent

A hydrophobizing agent preferred herein comprises an alkyl ketene dimer (AKD) or an alkenylsuccinic anhydride (ASA) or both. The hydrophobizing agent preferably consists of the aforementioned compound(s).

Flow Agent

A preferred flow agent is a polyamine, preferably an aliphatic polyamine. One example of a flow agent is commercially available as Eka ATC 4150 from Eka Chemicals. The flow agent is preferably an agent that modifies flow properties of the composition. The flow agent is added to the composition preferably as an aqueous solution, more preferably as an aqueous cationic polymer solution.

Negative Mold

A useful negative mold is any mold that seems suitable to the person skilled in the art for the use of the invention, especially for hot pressing. The negative mold is preferably a negative mold of the container. This means that the negative mold preferably defines a shape of the container wall, especially of the container layer, of the container by virtue of its configuration, preferably by virtue of a configuration of a surface of the mold wall facing the mold interior. The container here preferably comprises a container wall that partly surrounds a container interior. The container wall preferably has a container opening, where the container interior has a maximum diameter in a plane perpendicular to a height of the container interior, where the container interior has a diameter less than the maximum diameter of the container interior at least in sections in the direction from the plane to the container opening. The mold wall is preferably permeable to the liquid, but impermeable to the particles of the multitude of particles. For this purpose, the mold wall may take the form of a mesh or grid, or may be perforated or else porous.

Preferably, the negative mold is designed to accommodate the container blank and for demolding of the container obtained therefrom in a multipart manner, for example constructed from half-shells. Moreover, the mold wall preferably has a mold opening. The latter has preferably been designed and arranged such that a pressure in the further mold interior can be increased in method step b) of method 1. For this purpose, the mold opening may be designed for introduction of a fluid into the mold interior. Additionally or alternatively, the mold opening may be arranged and designed such that, in method step b), a solid body can be introduced at least partly into the mold interior for contacting of the container blank on a side remote from the mold wall. As set out above, the solid body may be configured as a hollow body with an elastically deformable wall. The mold interior is preferably connected to an environment of the negative mold by a multitude of openings in the mold wall. A preferred multitude of openings is one selected from the group consisting of a multitude of holes, a multitude of channels, and a multitude of pores, or a combination of at least two of these. The mold wall is preferably at least partly in the form of a mesh or grid, or is perforated or porous. The openings of the multitude of openings are preferably in such a form that they are permeable to the liquid and less permeable by comparison, preferably impermeable, to the particles of the multitude of particles. The openings of the multitude of openings here preferably at least predominantly have a size less than an average diameter of the particles of the multitude of particles.

Shaping of the Container Blank

A useful measure for shaping of the container blank in method step b) is any that seems suitable to the person skilled in the art in order to obtain the container of the invention from the container blank. These especially include measures for reducing a content of liquid in the blank wall. Preferably, the shaping comprises pressing of the blank wall or heating of the blank wall or both, the latter preferably in the form of hot pressing of the blank wall. Pressing herein is exerting of a force against an opposing force in the opposite direction, preferably in order thereby to achieve compressing of the pressed material, for example of the blank wall.

Test Methods

The following test methods were used within the context of the invention. Unless stated otherwise, the measurements were conducted at an ambient temperature of 23° C., an ambient air pressure of 100 kPa (0.986 atm) and a relative air humidity of 50%.

Determining the Proportion of Liquid (also Residual Moisture Content Herein) of the Composition of the Blank Wall and of the Container Layer The proportion of liquid is determined to the standard DIN EN ISO 287:2009-09 with the aid of a heated cabinet. In this determination, either 1000 ml of the composition are taken as a sample, weighed and dried to constant mass in the heated cabinet at 105° C., or 10 blanks or 10 containers are weighed and dried to constant mass in the heated cabinet at a temperature of 105° C. and the arithmetic mean is formed over the 10 blanks or containers.

Proportion of Solids and Solids-Forming Additives

The proportion of solids in the container layer or of solids and solids-forming additives collectively in the composition is likewise determined by employing the standard DIN EN ISO 287:2009-09. The proportion of the particles is calculated here by the following equation:

$$\text{\% by weight of the particles} = m_1/m_0 \times 100$$

In particular, the particles of the multitude of particles belong here to the solids.

Average Layer Thickness of a Polymer Layer

The layer thickness of a sample having an area of 0.5 cm² is determined by means of a scanning electron microscope (SEM). For this purpose, a cross section through the layer structure to be determined is conducted manually with a blade (Leica Microtome Blades 819). The cross section is sputtered with gold (Cressington 108auto from Cressington Scientific Instruments Ltd., Watford, UK) and then analysed by SEM (Quanta 450, FEI Deutschland GmbH, Frankfurt) under high vacuum ($p < 7.0 \cdot 10^{-5}$ Pa). The layer thicknesses of the individual layers are ascertained and read off with the "xT Microscope Control" software, version 6.2.11.3381, FEI Company, Frankfurt, Germany. To determine the average thickness, three samples are taken, the layer thickness in each sample is determined as described above, and the arithmetic mean is formed.

Compressive Strength 5 containers are used for this test. The test serves to ascertain the compression resistance along the longitudinal axis of the container and can be used to assess the durability of containers in the static case of storage and in the dynamic case of transport. Compression pressure testing is conducted on the individual containers in accordance with DIN EN ISO 2233:2000 and DIN EN ISO 12048. The test instrument used is a TIRAtest 28025 (Tira GmbH; 96528 Schalkau, Germany). The average of the maximum crush load (load value) is determined. This describes the value that leads to failure of the containers.

Water Vapor Permeation Rate

Water vapor permeation rate is determined according to standard ASTM F1249-13. The container to be examined is stuck to a holder with a 2-component adhesive (5 minute epoxy, ITW Devcon, Kiel, Germany) and connected to the measuring instrument. The measurement area of the sample corresponds to the internal area of the sample. The measurements are conducted at an ambient temperature of 23° C., an ambient air pressure of 100 kPa (0.986 atm) and a relative air humidity of 50% on one side of the sample and of 0% on the other side of the sample. The test instrument is a Permatran—W Model 3/33 from Mocon, Neuwied, Germany. For the measurements, samples at ambient temperature are used. Further settings and factors that affect the measurement—especially the others listed under point 12 of the standard ASTM F1249-13—are defined by the measuring instrument used and the proper use and maintenance thereof according to the manufacturer's handbook. The value obtained for the water vapor permeation rate is converted to $cm^2$ of container wall (inside) and year.

Average Thicknesses and Densities of the Blank Wall and the Container Layer

The average thickness and density of the blank wall and the container layer are determined by taking 5 samples having the dimensions of about 1.5 cm×1.5 cm from the blank wall or container layer. The average thickness and density of the blank wall or container layer are determined according to the standard DIN EN ISO 534: 2012-02 in accordance with the scope of application under point 1a) "the measurement of a single sheet of paper or board as a single sheet thickness". What is reported here as the average density is the apparent sheet density $d_s$ according to point 10.3.1 of the standard.

Average Fiber Length

Average fiber length is determined by dissolving the sample in water and analyzing with a Metso Fractionator, Metso Germany GmbH, Leuna, Germany.

Surface Characterization of the Container Layer

With the aid of a Microprof interferometry test instrument and the FRT Mark III software, both from FRT, Germany, according to the manufacturer's instructions and in accordance with the standards DIN EN ISO 16610-21:2013-06 and DIN EN ISO 25178-604:2013-12, the average arithmetic height sPa of the surface of the samples is determined. For this purpose, the region of the sample to be analyzed is placed on the sensor and the average arithmetic height sPa is determined for an area of 2500 μm×2500 μm. For this purpose, a "middle filter" with the value of 10 is applied to the raw data obtained, and a third-degree polynomial is subtracted from these values. A compressed surface typically has an average arithmetic height of not more than 10 μm, often less than 5 μm. A cut surface typically has an average arithmetic height of more than 10 μm, often exceeding 20 μm.

Modulus of Elasticity

The modulus of elasticity of the inner ring is determined in accordance with standard DIN EN ISO 6721-1:2011-08.

Shore A Hardness

The Shore A hardness of the inner ring is determined by applying standard DIN EN ISO 868:2003-10.

The invention is described in more detail hereinafter by examples and drawings, although the examples and drawings do not imply any restriction of the invention. Moreover, the drawings, unless stated otherwise, are not to scale.

Pulp

A pulp is provided with a fiber content of 0.6% by weight, and additives with a proportion of EKA DR25 SF content (AKD from Eka Chemicals AB, Bohus, Sweden) of 0.02% by weight and a proportion of EKA ATC 4160 content (polyamine from Eka Chemicals AB, Bohus, Sweden) of 0.0025% by weight, and a residue of water. The fibers here are ground wood fibers having an average fiber length of 1.5 mm.

Negative Mold of the Container Blank

Figure 5:
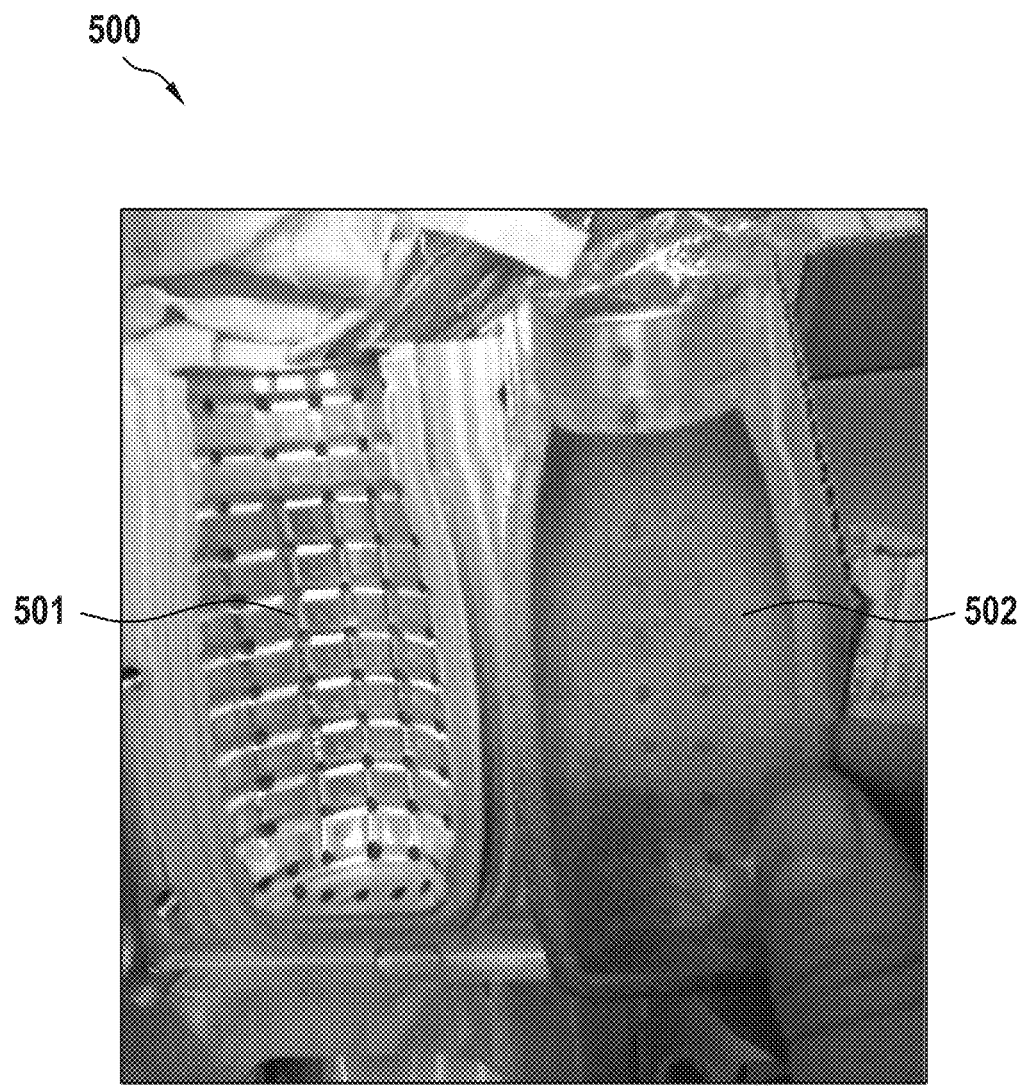
Figure 11:
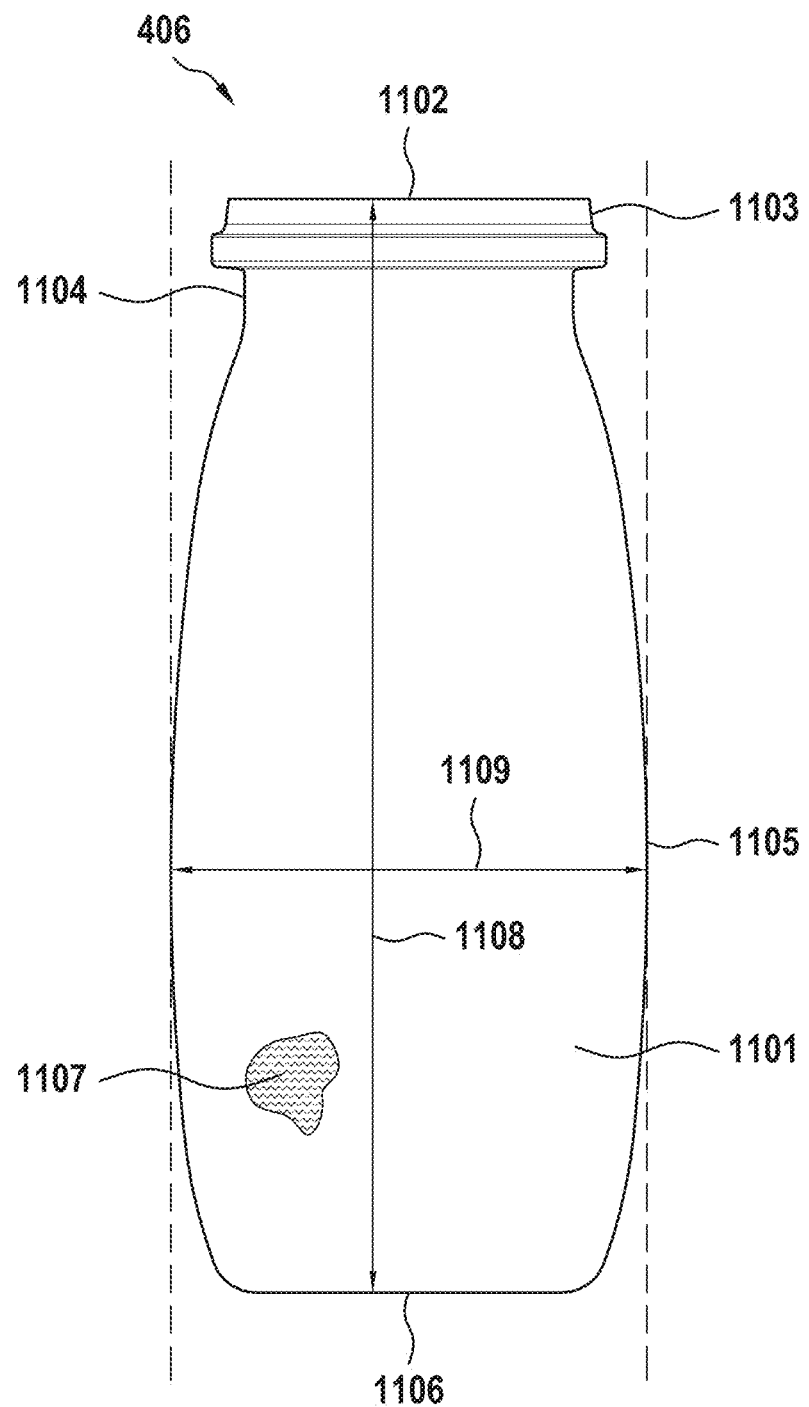

In addition, a negative mold of a container blank of the container to be produced is provided. The container is a bottle as shown in FIG. 11. The negative mold of the container blank consists of half-shells each having a two-part construction. Each half-shell is also composed of a plastic carrier having a multitude of holes of several millimeters in diameter and a sieve mold inserted therein, composed of a metal sieve with mesh size 0.5 mm. The sieve mold here forms a surface of the mold wall facing the mold interior, which constitutes a contact area with the container blank. FIG. 5 shows a photograph of a half-shell of the negative mold, with the sieve mold having been removed from the plastic carrier.

Production of the Container Blank

The half-shells of the negative mold are assembled and a rubber hose is connected to the mold opening as feed, such that pulp can be pumped through the mold opening into the mold interior. At first, 0.42 liter of the pulp is introduced through the mold opening into the mold interior. The flow rate of the pulp here does not exceed 200 mm/s. Once the feeding of this first portion of the pulp has been stopped, compressed air is injected into the mold interior at 6 bar. In this way, the water in the pulp is partly forced out of the mold interior through the mold wall and hence the pulp introduced is partly dewatered. Then a further 0.42 liter of the pulp is pumped into the mold interior as a further portion, again via the rubber hose through the mold opening. Here too, a maximum flow rate of 200 mm/s of the pulp is not exceeded. Again, the flow of the pulp is stopped and compressed air is injected into the mold interior at 6 bar in order to further dewater the pulp in the mold interior. The sum total of the fiber content and additive content of the mass obtained in the mold interior that has been deposited on the mold wall is now 25% by weight.

The water content is 75% by weight. This mass forms the blank wall of the container blank. It has an average density of 0.2 $g/cm^3$. The container blank is demolded by separating the two half-shells of the negative mold of the container blank from one another.

Negative Mold of the Container

A negative mold of the container to be produced is provided. The negative mold of the container consists of half-shells each consisting of a porous aluminum (available as AlSi$_7$Mg from Exxentis). Channels for removal of water have been introduced into the aluminum. The channels have a diameter of 0.3 mm. In addition, the mold has a mold opening through which the hollow body below can be introduced into the blank interior when the container blank is in the mold interior. In addition, the shaping tool described below may grip onto the mouth region of the container blank present in the mold via the mold opening.

Shaping Tool

In addition, a shaping tool is provided, which is designed to shape the mouth region of the container (see FIGS. 6 to 10). For this purpose, the shaping tool has an outer ring made of aluminum that concentrically surrounds an inner ring made of silicone. The blank wall of the container blank may be accommodated between the two circular rings in the mouth region of the container blank that forms the blank opening with the edge foremost and hence compressed. In addition, the shaping tool comprises a hollow body disposed within the inner ring with an elastically deformable wall made of rubber. The hollow body has been provided with a feed through which compressed air can be injected into the hollow body at a few bar.

Production of the Container

Firstly, the negative mold of the container is preheated to 170° C. by means of an electrical heater. Then the container blank produced as described above is introduced into the negative mold of the container and the half-shells of the mold are assembled. After the mold has been closed, the shaping tool is placed onto the mold as shown in FIGS. 6 to 10. The shaping tool here is pressed onto the container blank with a pressure of 25 N/mm$^2$. As a result, the container blank is pressed lengthwise and hence reduced to 97% of the original height of the container blank. In addition, the edge of the mouth region of the blank wall is accommodated between the inner ring and the outer ring such that the blank wall is surrounded by the shaping tool at its edge. As a result, the edge is pressed and hence a relatively smooth surface without protruding fibers is obtained. The hollow body introduced into the blank interior as shown in FIGS. 6 to 10 is inflated with compressed air at 3 bar in order thus to press against the blank wall with a pressure of 0.4 N/mm$^2$ from the inside for 90 seconds. The elastically deformable hollow body made of rubber also presses against the inner ring made of silicone and hence forms smooth transitions of the mouth region of the blank wall. At the same time, a reduced pressure of 0.8 bar is applied to the outside of the mold wall of the negative mold of the container. The sum total of fiber content and additive content of the container layer that forms the container wall of the container now formed is 93% by weight, and the average density is 0.75 g/cm$^3$. The water content of the container layer is 7% by weight.

Coating

The coating is effected as an ambient temperature of 23° C., an ambient air pressure of 100 kPa (0.986 atm) and a relative air humidity of 50%, such that the moisture content of the container obtained as described above remains constant at 7% by weight. The container is transferred to a powder coating system of the Encore HD type from Nordson, Erkrath, Germany. This system includes a holding device with a shaped body that accommodates and hence holds the container. The shaped body is grounded and mounted so as to be rotatable about an axis. The holding device also includes a drive unit that can rotate the shaped body at 1500 revolutions per minute. The shaped body is in the form of a cup for receiving the container, such that the shaped body partly surrounds the container. The container wall of the container accommodated in the shaped body is contacted here with the grounded shaped body over 70% of its surface remote from the container interior. In addition, the powder coating system includes a spray lance that releases an LDPE powder. This lance has a multitude of nozzles. The LDPE powder is negatively electrically charged by applying a voltage of 25 kV at the lance tip and atomized both horizontally and vertically through the nozzles. The lance is introduced into the container interior here at a speed of 15 m/min to an extent of 90% of the height of the container interior. Once the LDPE powder has been sprayed onto the inside of the container layer and the edge surrounding the container opening, the container is heated to 185° C. in an oven for 10 min. This forms a continuous inner polymer layer from the powder coating that superimposes the container layer on its inside completely, i.e. to an extent of 100%, with a layer thickness of 40 µm. The container is then transferred again into the holding device and secured on a conical spike rather than the cup-shaped body. The lance is then used to spray further LDPE powder at an electrical voltage of 25 kV from the outside onto the mouth region of the container, including the edge surrounding the container opening. Subsequently, container is heated to 185° C. in the oven again for 10 min. The powder coating just applied gives rise here to a continuous outer polymer layer that covers the mouth region of the container on the outside with a layer thickness of 40 µm to an extent of 15% of the outside.

Filling and Closing

The container produced as described above is sterilized and filled with a yoghurt in an Ermifill 24L filling machine from Ermi, France. Thereafter, a pull tab made of aluminum is sealed onto the edge surrounding the container opening by heat-sealing with the polymer layers applied as sealant and hence the container is closed.

Figure 2:
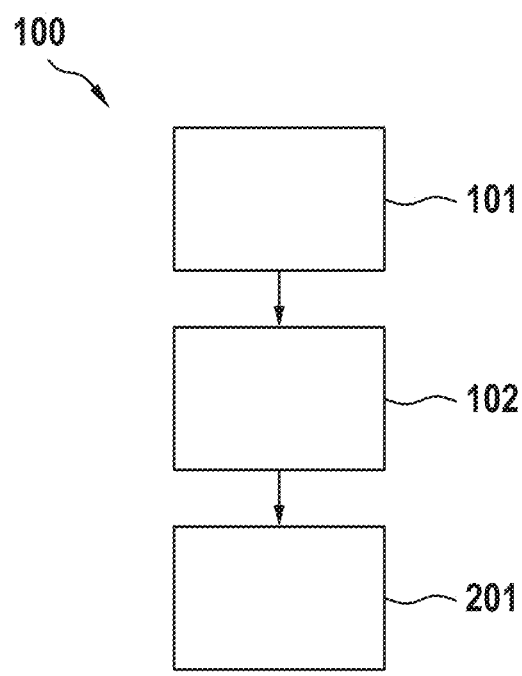
Figure 3:
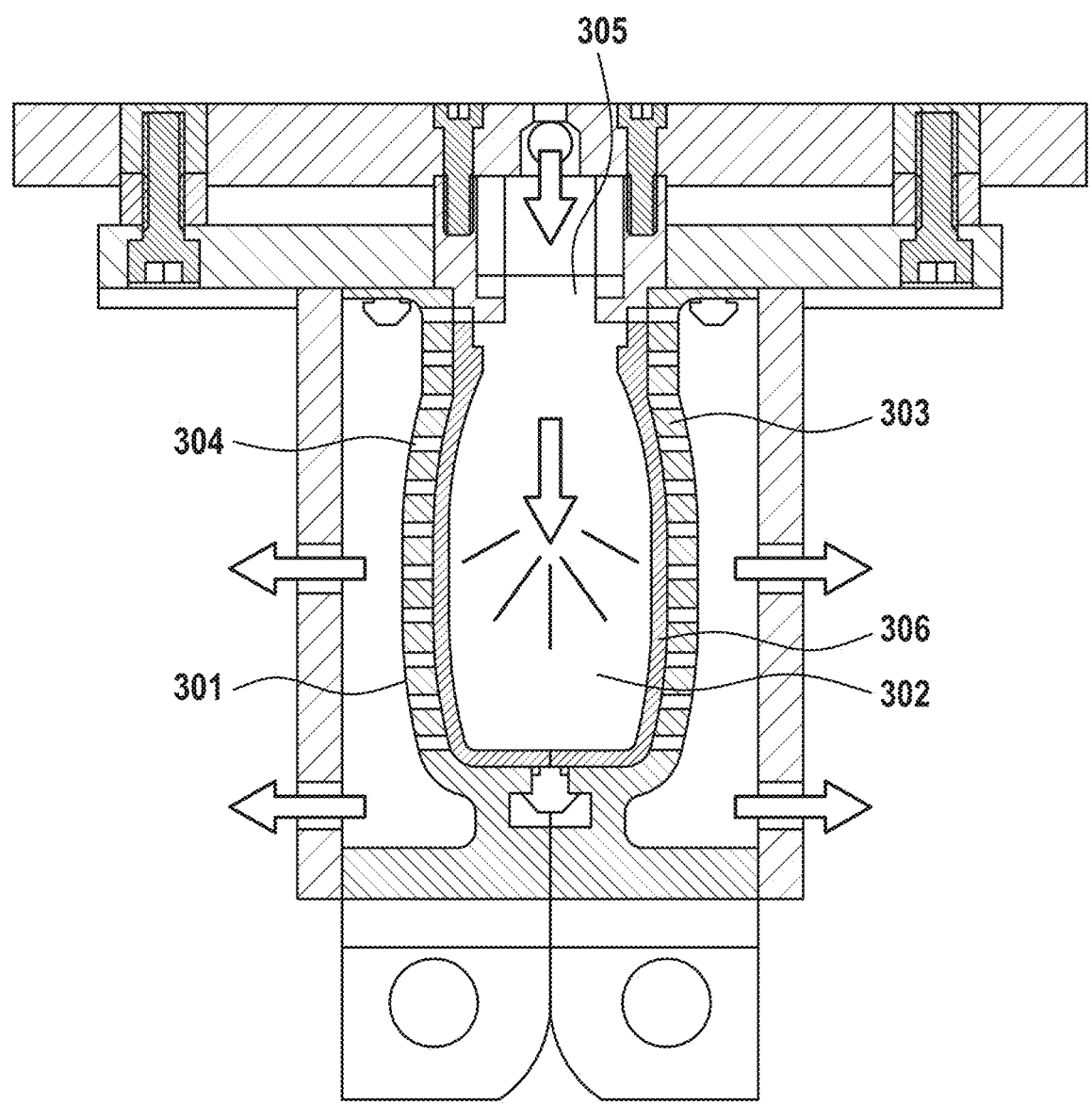
Figure 4:
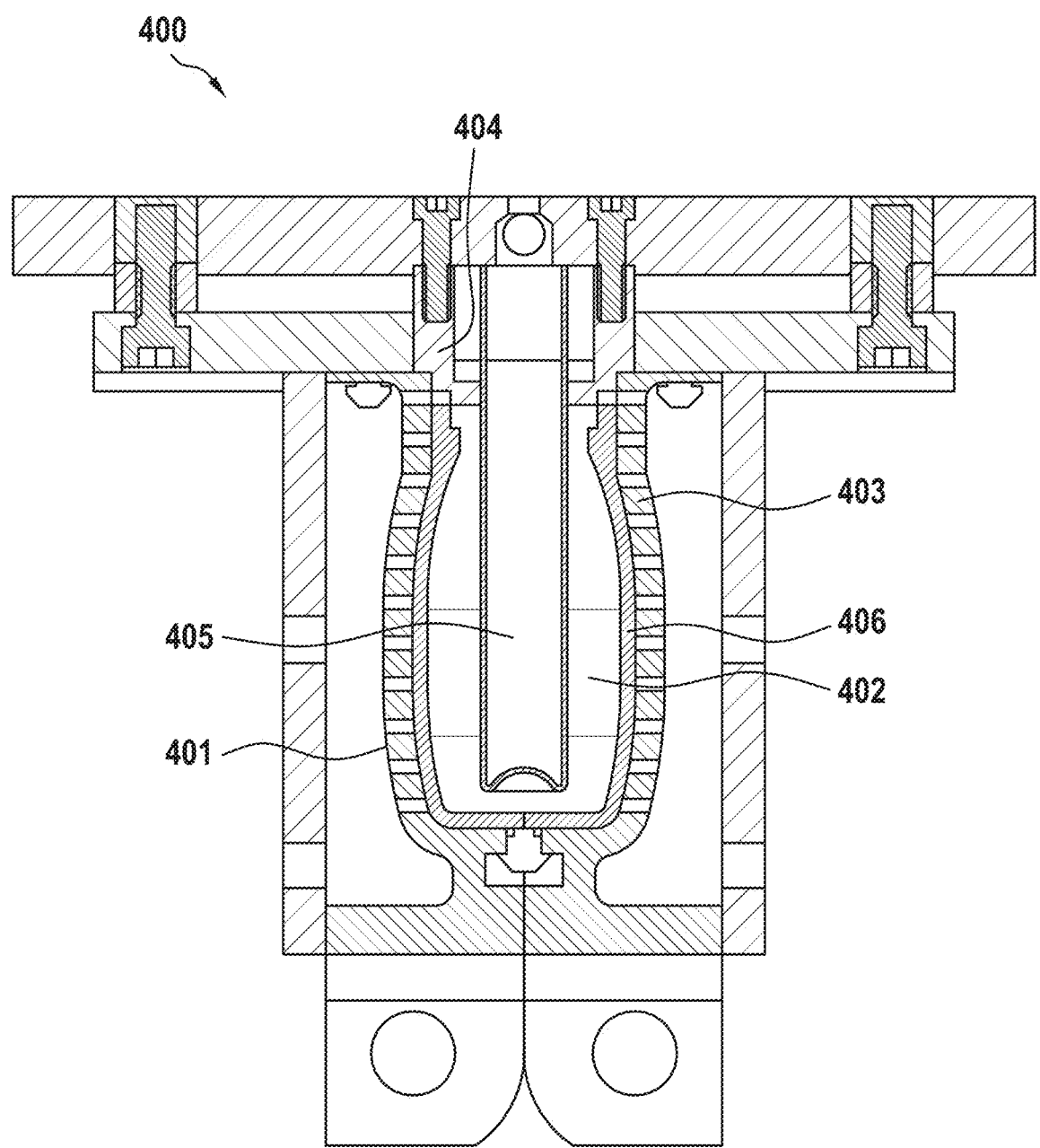
Figure 6:
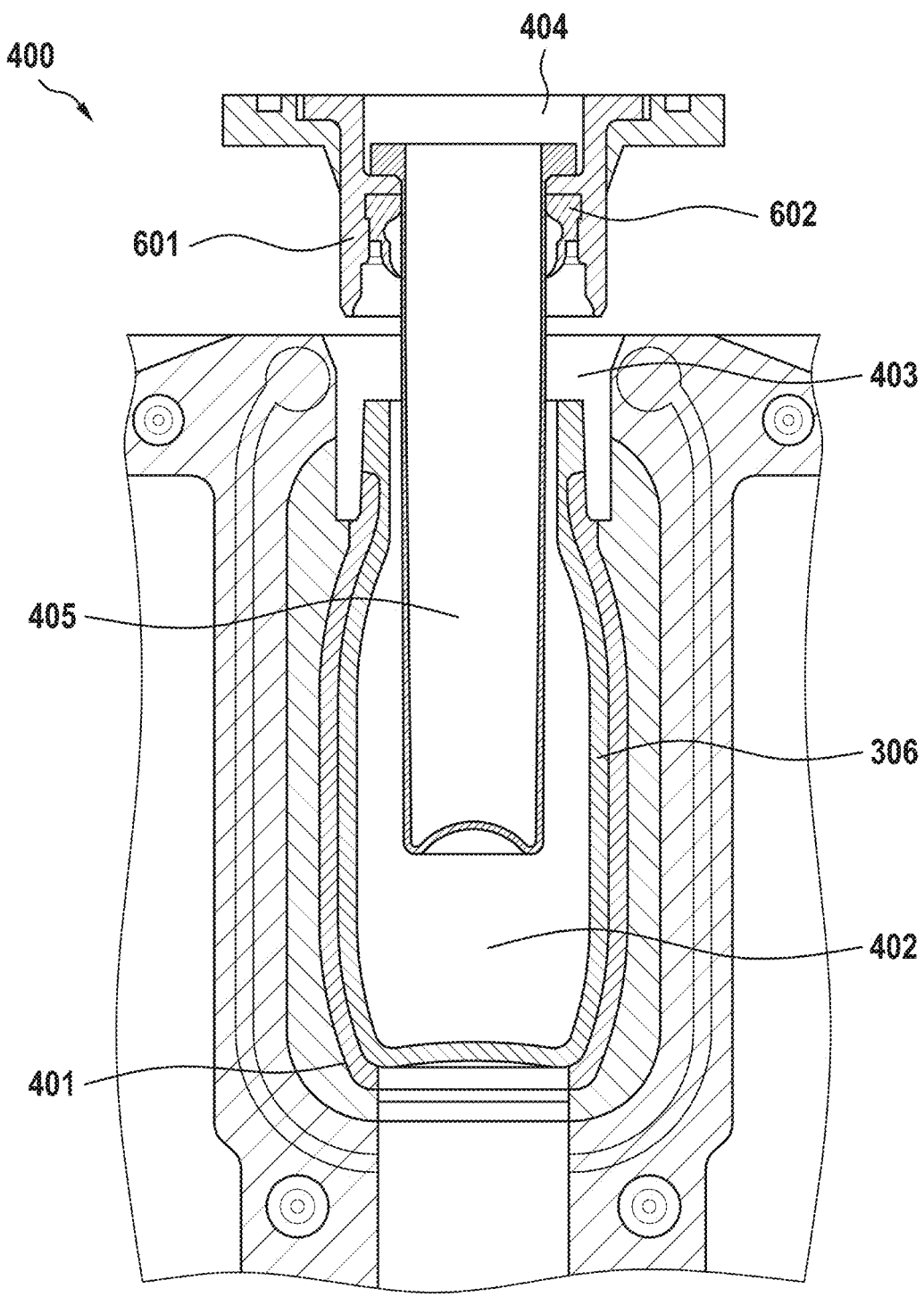
Figure 7:
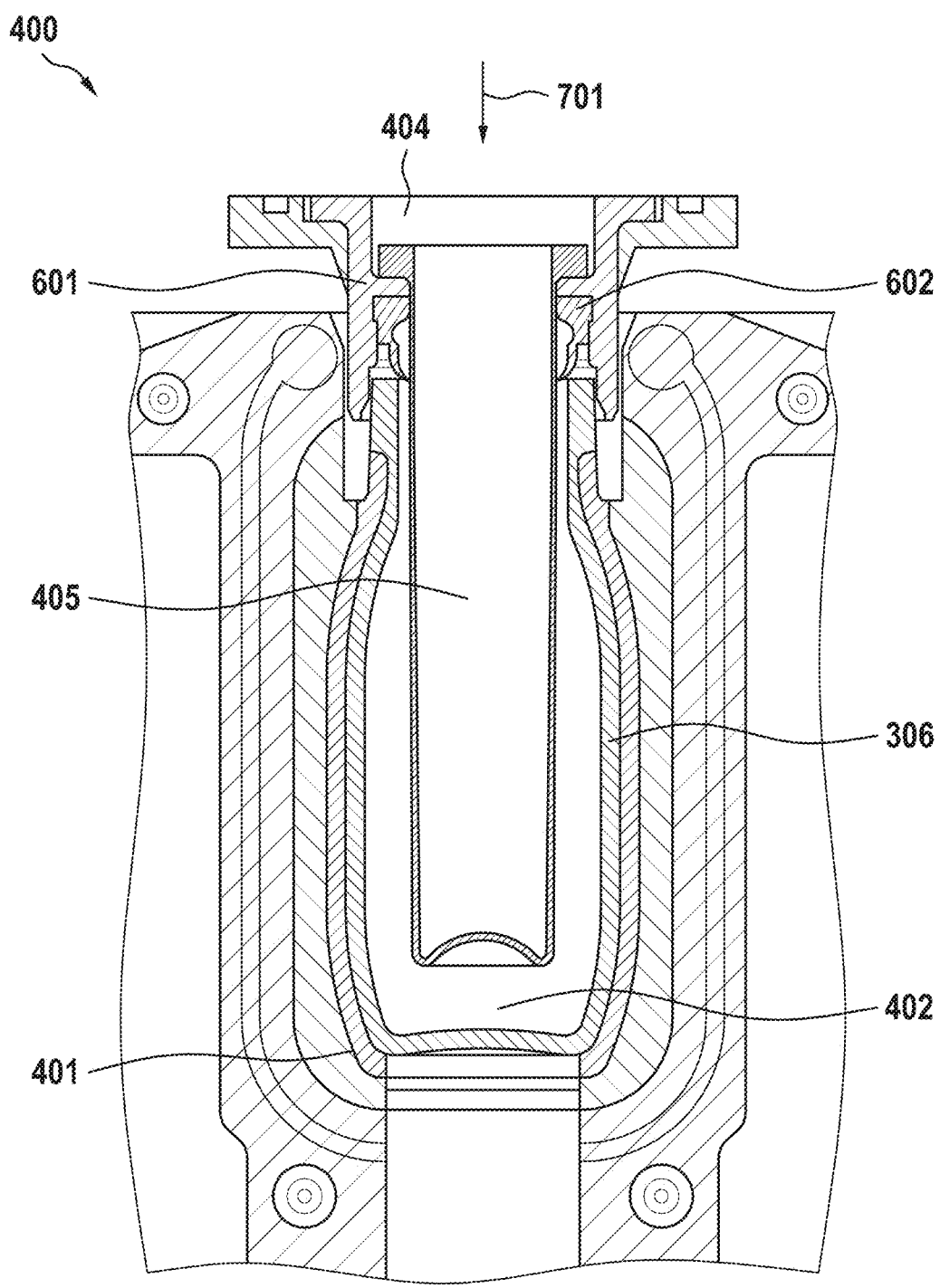
Figure 8:
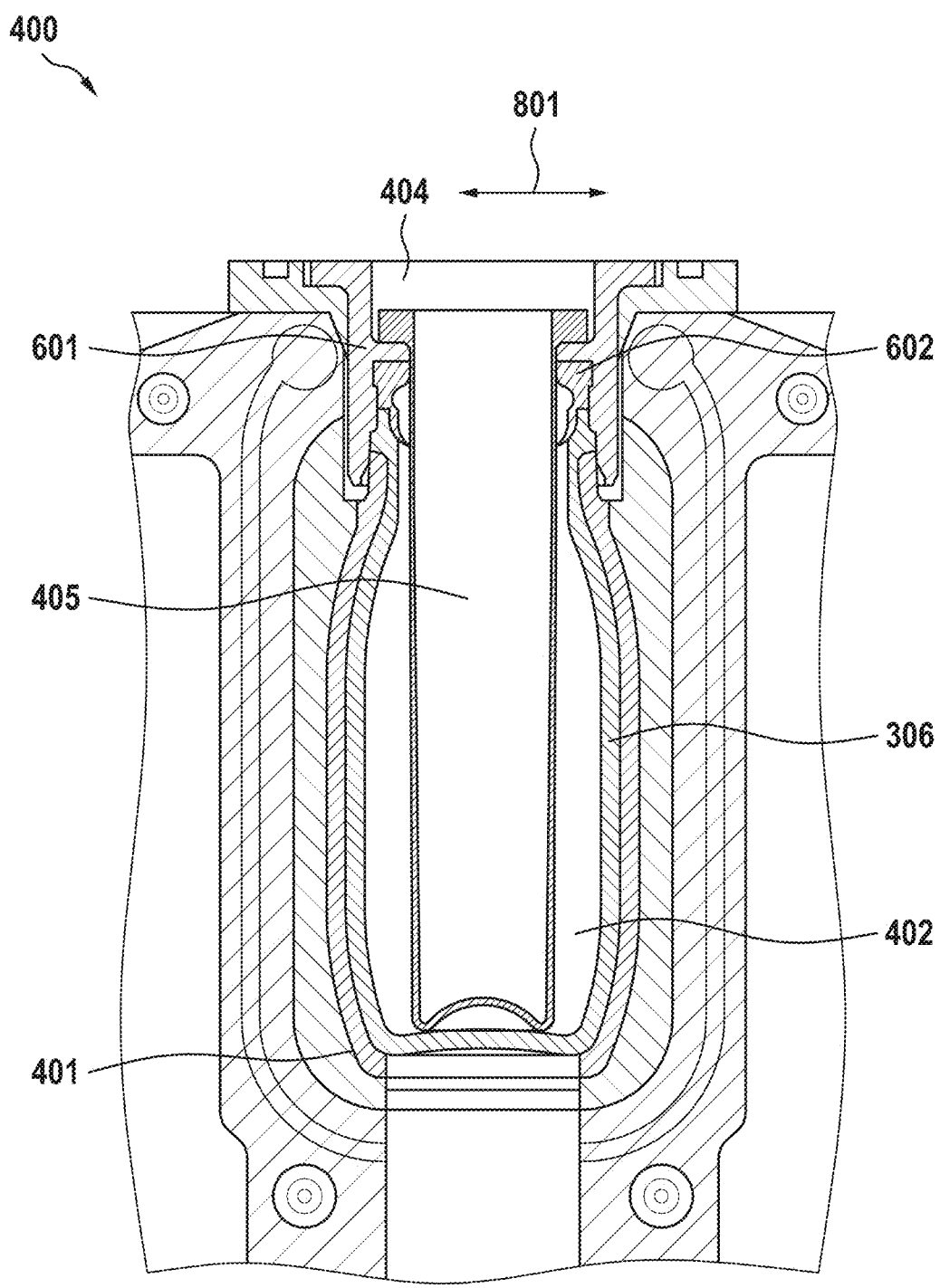
Figure 9:
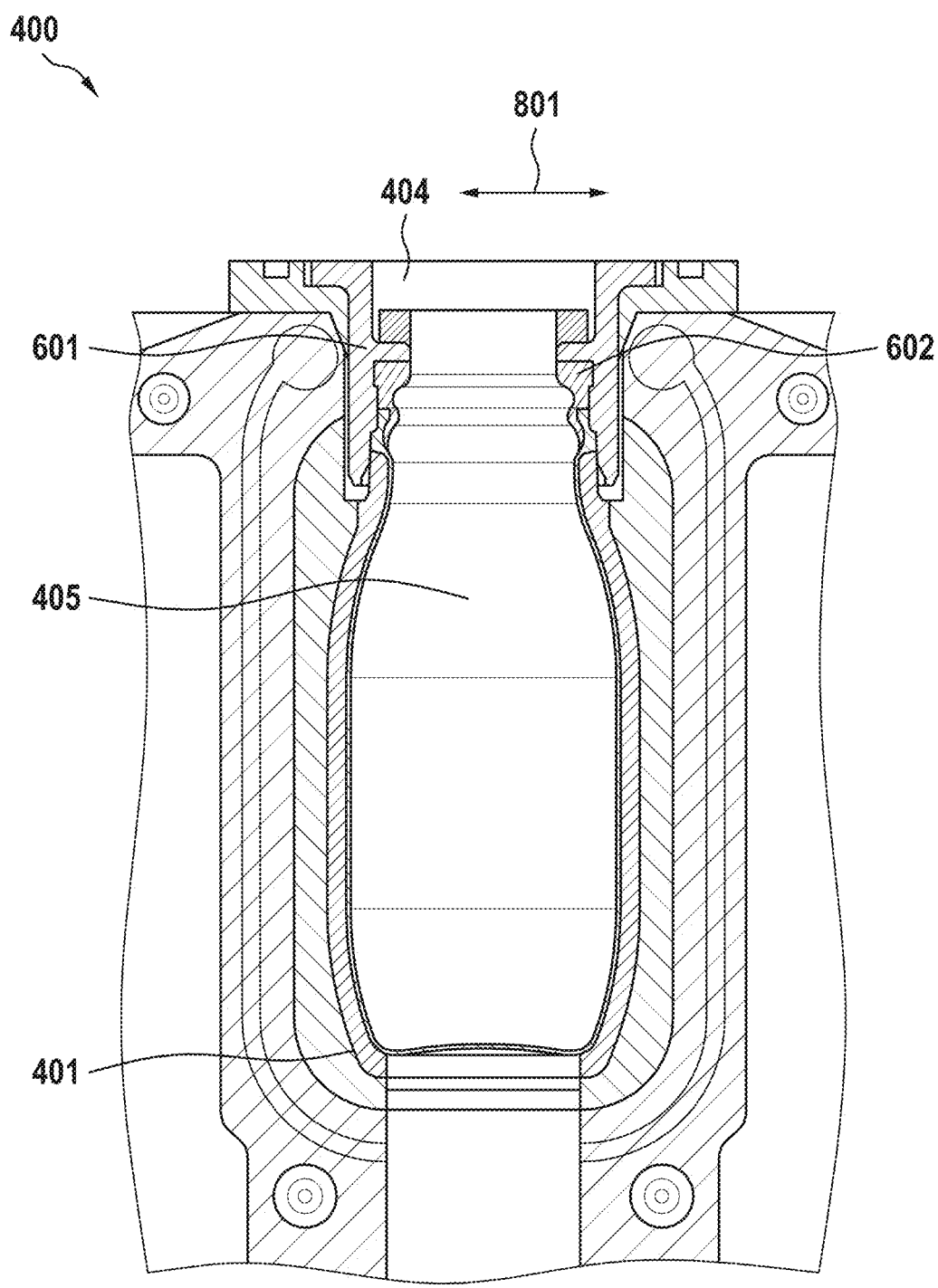
Figure 10:
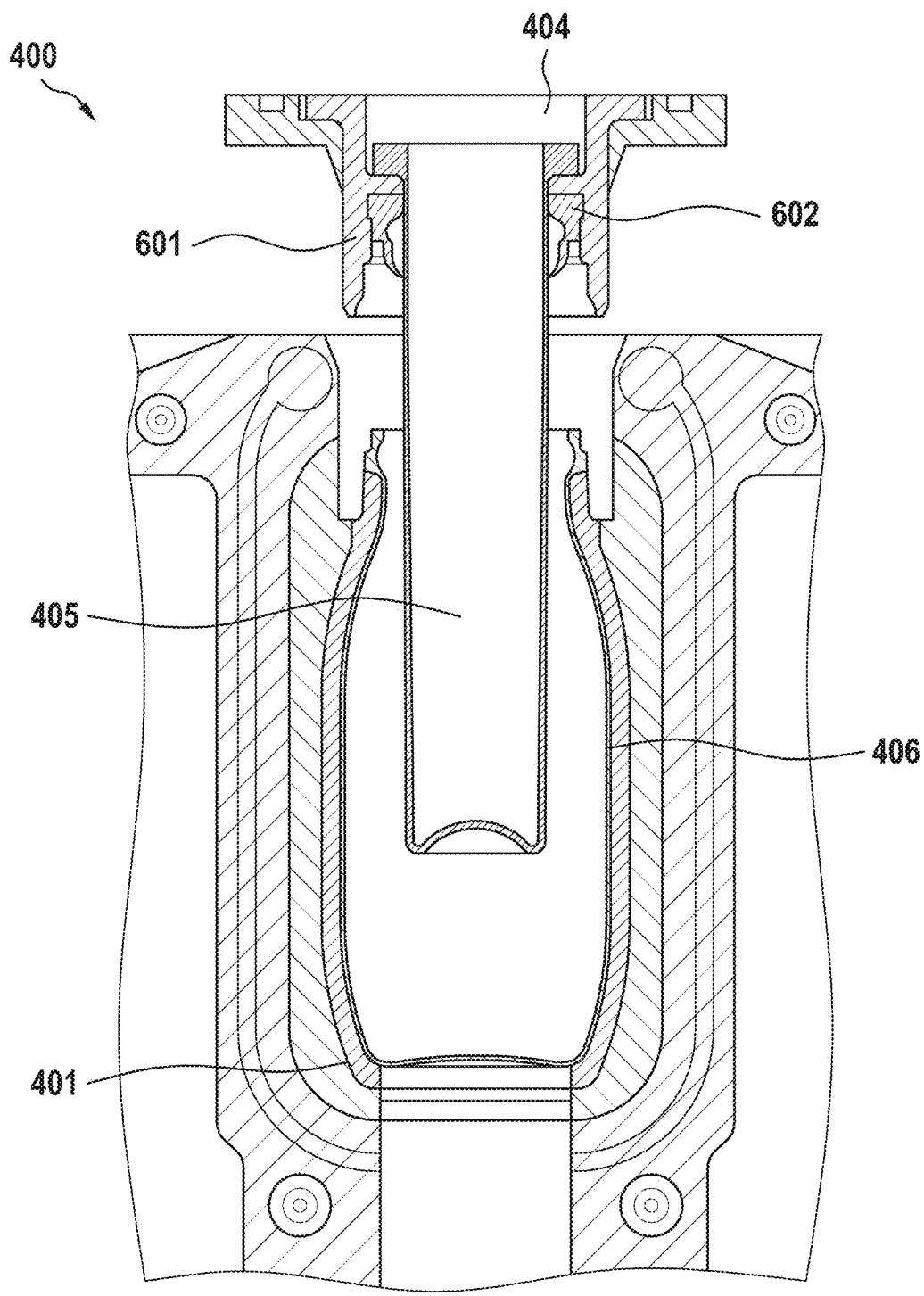
Figure 12:
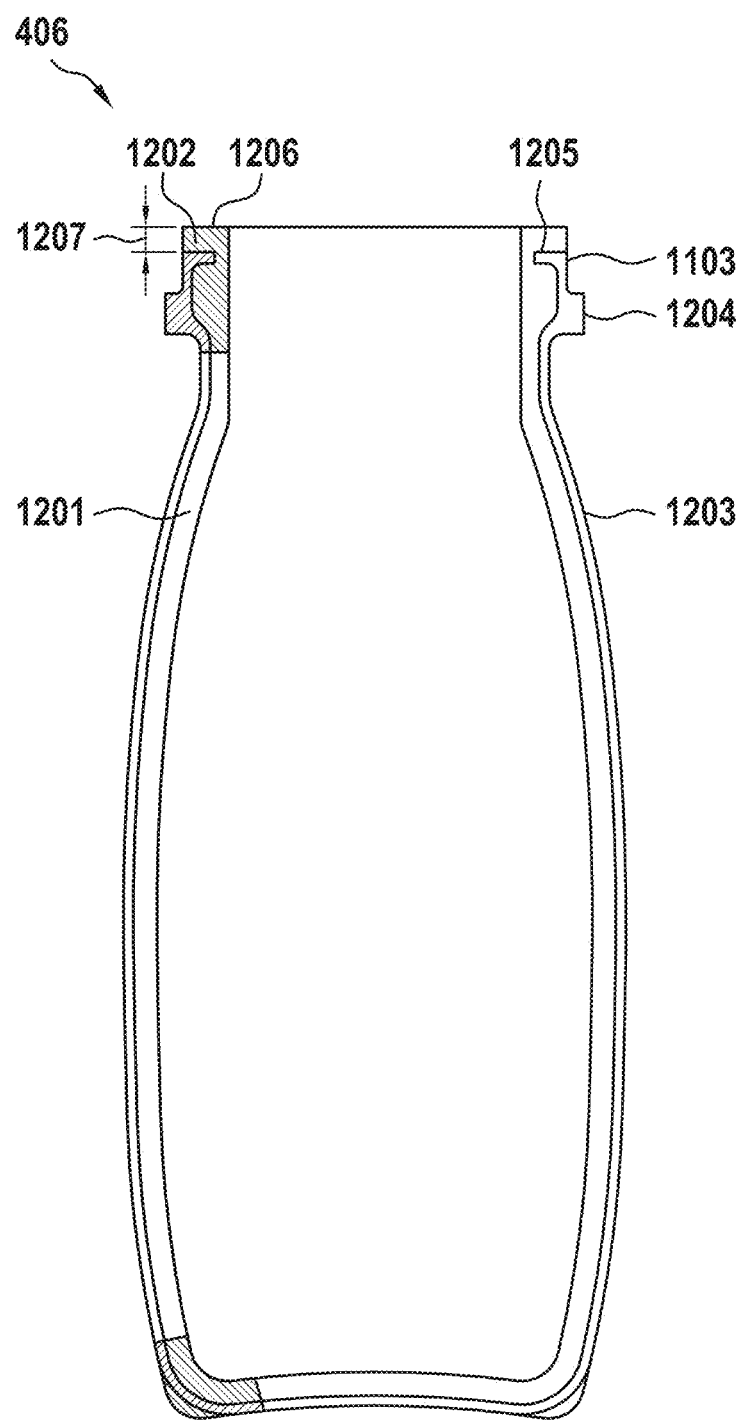
Figure 13:
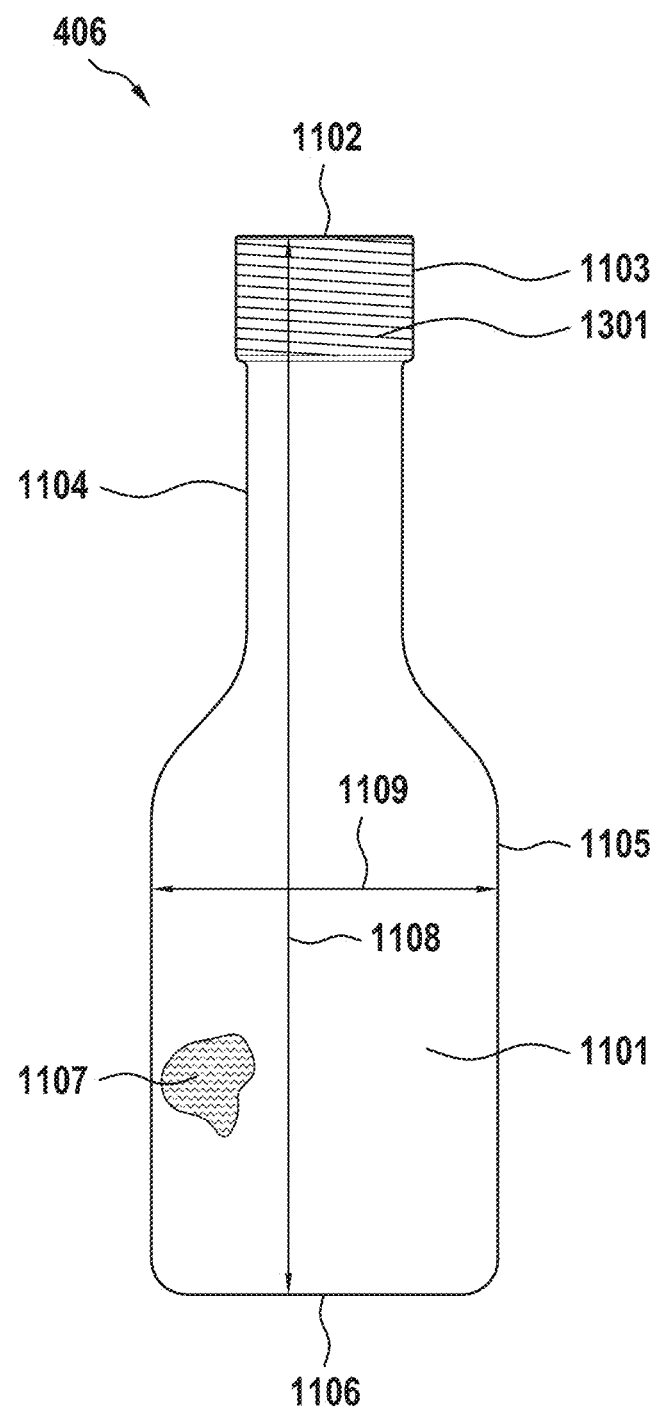
Figure 14:
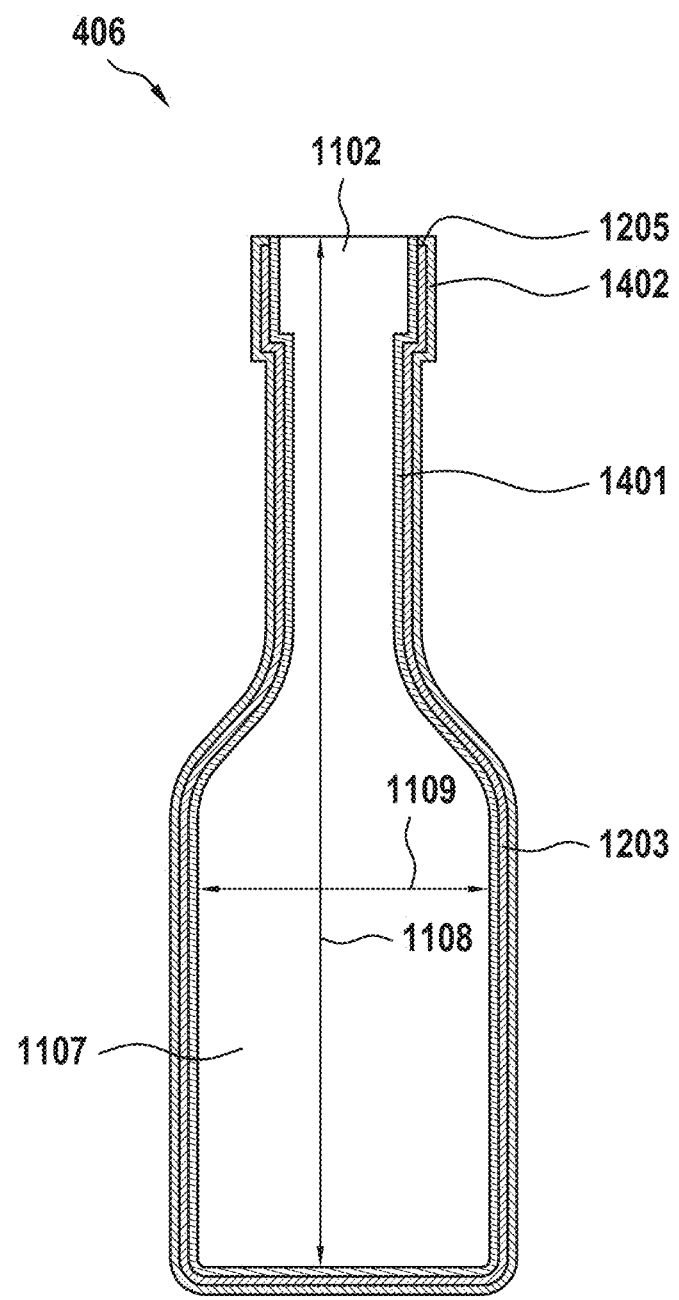
Figure 15:
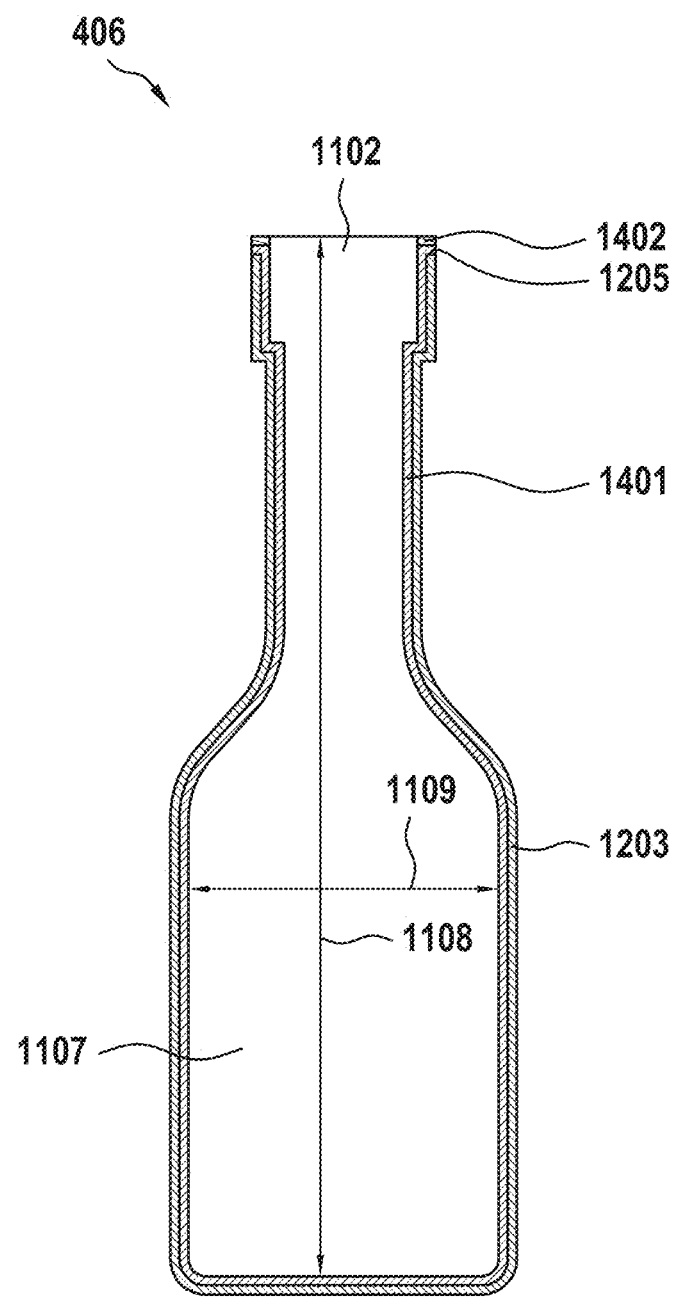
Figure 16:
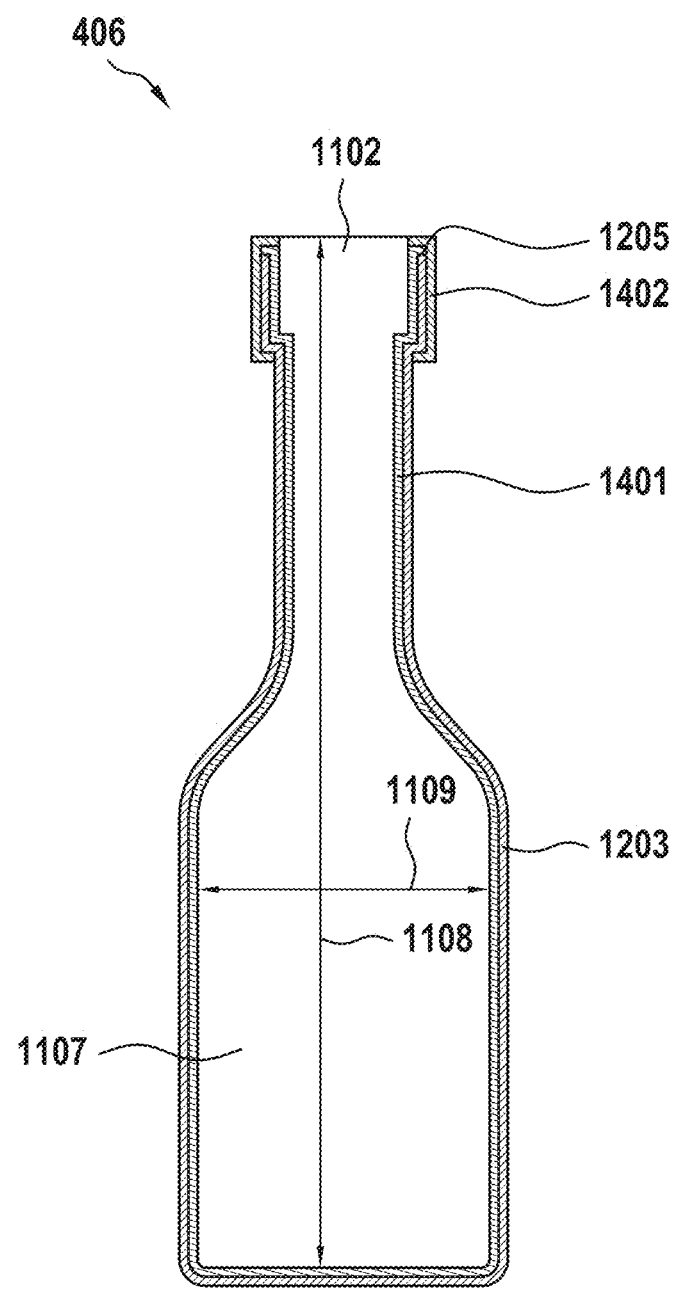
Figure 17:
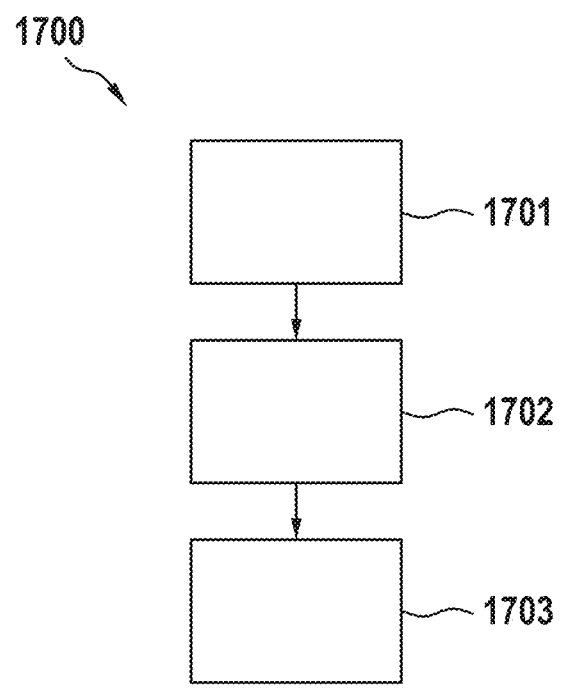

The figures respectively show, in schematic form and not to scale, unless stated otherwise in the description or the respective figure:

FIG. 1 a flow diagram of a method of the invention for producing a container;

FIG. 2 a flow diagram of a further method of the invention for producing a container;

FIG. 3 a scheme for production of a container blank;

FIG. 4 a scheme for method step b) of the method of FIG. 1;

FIG. 5 a photograph of a half-shell of the negative mold of the container blank in FIG. 3;

FIG. 6 a further scheme for method step b) of the method of FIG. 1;

FIG. 7 a further scheme for method step b) of the method of FIG. 1;

FIG. 8 a further scheme for method step b) of the method of FIG. 1;

FIG. 9 a further scheme for method step b) of the method of FIG. 1;

FIG. 10 a further scheme for method step b) of the method of FIG. 1;

FIG. 11 a schematic diagram of a container of the invention;

FIG. 12 a schematic longitudinal section through the container of FIG. 11 by comparison with a longitudinal section through the container blank from which this container has been obtained;

FIG. 13 a schematic diagram of a further container of the invention;

FIG. 14 a schematic longitudinal section through the container of FIG. 13;

FIG. 15 a schematic longitudinal section through a further container of the invention;

FIG. 16 a schematic longitudinal section through a further container of the invention; and FIG. 17 a flow diagram of a method of the invention for filling and closing a container.

FIG. 1 shows a flow diagram of a method 100 of the invention for producing a container 406. In a method step a) 101, a container blank 306 is provided. The container blank 306 comprises a blank wall 1201 that partly surrounds a blank interior. The blank wall 1201 here partly surrounds the blank interior in that the blank wall 1201 has a blank opening. In addition, the blank wall 1201 comprises a multitude of mechanical pulp fibers, and water in a proportion of 75% by weight, based on the total weight of the blank wall 1201. The container blank 306 can be provided by producing the container blank 306 as described in connection with FIG. 3. In a method step b) 102 of the method 100, the container blank 306 is shaped thereby obtaining a container 406. This shaping is effected in the form of a hot pressing operation and is elucidated in detail below in connection with FIGS. 4 to 10. The container 406 comprises a container wall 1101 that partly surrounds a container interior 1107. The container wall 1101 here partly surrounds the container interior 1107 in that the container wall 1101 has a container opening 1102. The container wall 1101 here consists of a container layer 1203 obtained from the blank wall 1201. This container layer 1203 comprises the water in a proportion of 5% by weight, based on the weight of the container layer 1203, and the particles of the multitude of particles.

FIG. 2 shows a flow diagram of a further method 100 according to the invention for production of a container 406. The method 100 of FIG. 2 comprises method steps a) 101 and b) 102 of the method 100 of FIG. 1 and additionally a downstream method step c) 201. In method step c) 201, the container layer 1203 is coated with an inner polymer layer 1401 on a surface facing the container interior 1107. This coating is effected as powder coating of the container layer 1203 with a polymer powder. The polymer powder is electrically charged here relative to the container layer 1203, sprayed onto the container layer 1203, and then heated above its melting point by blowing with hot air, so as to form a continuous inner polymer layer 1401.

FIG. 3 shows a scheme for production of the container blank 306 which is provided in method step a) 101 of the method 100 of FIG. 1. First of all, a composition consisting of water, a multitude of mechanical pulp fibers, AKD and ASA as hydrophobizing agents, and Eka ATC 4150 from Eka Chemicals as flow agent is provided. The composition comprises the fibers here in a proportion of 0.6% by weight, and the hydrophobizing agents and the flow agent in proportions of collectively less than 0.025% by weight, based in each case on the weight of the composition. The remainder of the composition to 100% by weight is water. The composition is also referred to as pulp. In addition, a negative mold 301 of the container blank 306 is provided. The negative mold 301 includes a mold wall 303 partly surrounding a mold interior 302. The mold wall 303 partly surrounds the mold interior 302 here in that the negative mold 301 includes a mold opening 305 that connects the mold interior 302 to an environment of the negative mold 301. The mold interior 302 has a maximum diameter in a plane perpendicular to a height of the mold interior 302, with the mold interior 302 having a diameter less than the maximum diameter of the mold interior 302 throughout in the direction from the plane to the mold opening 305, meaning that the mold interior 302 narrows from the plane of the maximum diameter toward the mold opening 305. The mold wall 303 has a multitude of openings 304. The size of the openings 304 has been chosen such that the mold wall 303 is permeable to the water from the pulp, but not the fibers of the pulp that have an average fiber length of 1.5 mm. The construction of the mold wall 303 is described in detail in connection with FIG. 5. For production of the container blank 306, a first portion of the composition is introduced into the negative mold 301. For this purpose, the first portion of the pulp flows through the mold opening 305 into the mold interior 302. Concurrently therewith, the pulp flowing in meets the inside of the mold wall 303, and the water from the first portion partly passes through the openings 304 and hence is removed again from the first mold interior 302. This is supported by a reduced pressure applied to the mold wall 303 from the outside. In this regard, the arrows in FIG. 3 show the flow of the water. In the aforementioned method steps, the first portion does not have a flow rate of more than 200 mm/s at any point in the mold interior 302. While the water from the first portion of the pulp partly leaves the mold interior 302 again, the fibers from the first portion cannot pass the mold wall 303 through the openings 304. As a result, the fibers are deposited on the side of the mold wall 303 facing the mold interior 302. In order to further dewater the deposited and partly dewatered pulp, compressed air is introduced into the mold interior 302, such that the pressure in the mold interior 302 is increased and the fibers with the remaining water are pressed against the mold wall 303 from the inside and hence a further proportion of the water is pressed out of the mold interior 302. Once the compressed air has been released again, a further portion of the pulp flows into the mold interior 302. Analogously to the above method steps, the pulp from the further portion flowing in meets the inside of the partly dewatered pulp from the first portion that has been deposited on the mold wall 303. A portion of the water from the further portion flows here through the partly dewatered pulp from the first portion and is removed through the openings 304, as a result of which this portion of the water is removed again from the mold interior 302. This is again supported by the reduced pressure applied to the mold wall 303 from the outside. The further portion here does not have a flow rate of more than 200 mm/s at any point in the mold interior 302. In order to further dewater the deposited and partly dewatered pulp from the first and further portions, compressed air is again introduced into the mold interior 302, such that the pressure in the mold interior 302 is increased once more and the fibers from the first and further portions with the remaining water are pressed against the mold wall 303 from the inside and hence a further proportion of the water is pressed out of the mold interior 302. Since the negative mold 301 is designed as the negative mold of the container blank 306, the latter is obtained as a result. The container blank 306 consists of the partly dewatered pulp and already has the shape of a bottle. Consequently, the container blank 306 has a blank wall 1201 that partly surrounds a blank interior. The blank wall 1201 has an average density of 0.2 g/cm$^3$. The blank wall 1201 has a blank opening, where the blank interior has a maximum diameter in a plane perpendicular to a height of the blank interior, where the blank interior has a diameter less than the maximum diameter of the blank interior throughout in the direction from the plane to the blank opening. The height of the blank interior here is a greatest dimension of the blank interior in any Cartesian spatial direction and extends from the blank opening to a section of the blank wall 1201 opposite the blank opening that is a base of the container blank 306. The region of the blank wall 1201 that forms the blank opening is referred to as mouth region 1202. Thereafter, the negative mold 301 consisting of half-shells is opened in order to demold the container blank 306 obtained.

FIG. 4 shows a scheme for method step b) 102 of the method 100 of FIG. 1. In this method step b) 102, the container 406 of the invention is obtained from the container blank 306 by hot pressing in a hot pressing apparatus. For this purpose, the container blank 306 is introduced into a negative mold 400 of the container 406 as part of the hot pressing apparatus. For this purpose, the negative mold 400 has been constructed from half-shells. The negative mold 400 includes a mold wall 401 partly surrounding a mold interior 402. The mold wall 401 is in porous form and accordingly has a multitude of openings 403, where the openings 403 are pores. The size of the pores has been chosen such that the mold wall 401 is permeable to the water present in the blank wall 1201, but not to the fibers. In addition, the hot pressing apparatus includes a shaping tool 404 comprising a solid body 405. This solid body 405 takes the form of a hollow body 405 with an elastically deformable wall. Shaping of the container blank 306 in the mold interior 402 of the negative mold 400 gives the container 406 from the container blank 306. The container 406 comprises a container wall 1101 that partly surrounds a container interior 1107. This consists here of a container layer 1203 which is obtained from the blank wall 1201. The container layer 1203 has an average density of 0.75 g/cm$^3$. Details of the hot pressing in the hot pressing apparatus are shown in FIGS. 6 to 10 and elucidated with regard thereto. FIGS. 6 to 10 should be viewed here in a time sequence.

FIG. 5 shows a photograph of a half-shell 500 of the negative mold 301 of the container blank 306 in FIG. 3. The half-shell 500 consists of a plastic carrier 501 with a multitude of holes. A sieve mold 502 has been inserted into this plastic carrier. The sieve mold 502 forms the surface of the mold wall 303 on which the fibers of the pulp are deposited in the production of the container blank 306.

FIG. 6 shows a further scheme for method step b) 102 of the method 100 of FIG. 1. This shows a section through the hot pressing apparatus with the negative mold 400 of the container 406 and the shaping tool 404 with the hollow body 405. The container blank 306 to be pressed is in the mold interior 402. The shaping tool 404 comprises a circular outer ring 601 made of aluminum and a circular inner ring 602 made of silicone. The inner ring 602 is concentrically within the outer ring 601 and arranged so as to be elastically deformable with respect thereto.

FIG. 7 shows a further scheme for method step b) 102 of the method 100 of FIG. 1. By comparison with FIG. 6, this shows that the shaping tool 404 with the hollow body 405 is moved in a first direction 701. As a result, the hollow body 405 is introduced further into the blank interior. In addition, the shaping tool 404 is in contact with the container blank 306 in its mouth region 1202. The contacting of the mouth region 1202 with the shaping tool 404 includes accommodating of the blank wall 1201 in the mouth region 1202 between the outer ring 601 and the inner ring 602 of the shaping tool 404.

FIG. 8 shows a further scheme for method step b) 102 of the method 100 of FIG. 1. By comparison with FIG. 7, the shaping tool 404 has been moved here further in the first direction 701, such that the shaping tool 404 grips the negative mold 400 which is closed. By virtue of this movement, the shaping tool 404 grips the mouth region 1202 of the container blank 306 such that it presses the blank wall 1201 in the first direction 701 along a length of the container blank 306. This reduces the height of the container blank 306. At the same time, the shaping tool 404 grips the mouth region 1202 of the container blank 306 such that the blank wall 1201 in the mouth region 1202 is pressed in a further direction 801. The further direction 801 is arranged radially here, i.e. in a plane perpendicular to the height of the container blank 306. In FIG. 8, the mouth region 1202 of the container blank 306 has already been pressed between the outer ring 601 and the inner ring 602 and hence, by shaping, the mouth region 1103 of the container 406 has been obtained. It can also be seen that the outer ring 601 surrounds the blank wall 1201 in the mouth region 1202 of the container blank 306 along an outer circumference of the mouth region 1202. In addition, the inner ring 602 engages with the blank interior and contacts the blank wall 1201 in the mouth region 1202 of the container blank 306 along an inner circumference of the mouth region 1202 of the container blank 306.

FIG. 9 shows a further scheme for method step b) 102 of the method 100 of FIG. 1. By comparison with FIG. 8, oil at 180° C. was introduced here into the hollow body 405, such that the elastically deformable wall thereof has been deformed to such a degree that it presses the blank wall 1201 against the mold wall 401 from the inside. This affords the container layer 1203 that forms the container wall 1101, and hence the container 406.

FIG. 10 shows a further scheme for method step b) 102 of the method 100 of FIG. 1. Here, proceeding from FIG. 9, the oil was sucked back out of the hollow body 405 and the latter is removed from the mold interior 402, such that the container 406 can be demolded from the negative mold 400 by opening the half-shells.

FIG. 11 shows a schematic diagram of a container 406 of the invention. The container 406 was obtained by the method 100 of FIG. 2. The container 406 comprises a container wall 1101 that partly surrounds a container interior 1107. The container wall 1101 consists of an inner polymer layer 1401 of PLA and a container layer 1203, which completely superimpose one another as layers of a layer sequence in that sequence in the direction from the container interior 1107 outward. The container layer 1203 was obtained here as described above in method step b) 102 of the method 100 via a blank wall 1201 from a pulp. The container 406 is a bottle having a container opening 1102 in a mouth region 1103. The mouth region 1103 is connected to a bottle body 1105 via a bottle neck 1104. In addition, the bottle includes a base 1106. The container layer 1203 consists to an extent of 94% by weight, based on the total weight of the container layer 1203, of solids including fibers obtained from spruce wood as ground wood with an average fiber length of 1.5 mm and, as additives, AKD and ASA, and also Eka ATC 4150 from Eka Chemicals. In addition, the container layer 1203 has a moisture content of 6% by weight, based on the total weight of the container layer 1203. The container layer 1203 does not include any fold or crease at all. The container 406 includes the inner polymer layer 1401 in a proportion of 15% by weight, based on the total weight of the container 406. The container interior 1107 has a maximum diameter 1109 in a plane perpendicular to a height 1108 of the container interior 1107, where the container interior 1107 has a diameter less than the maximum diameter 1109 of the container interior 1107 throughout in the direction from the plane to the container opening 1102. This is illustrated in the dotted guidelines included in FIG. 11.

FIG. 12 shows a schematic longitudinal section through the container 406 of FIG. 11 by comparison with a longitudinal section through the container blank 306 from which this container 406 has been obtained. This shows the container layer 1203 that has been obtained from the blank wall 1201 by the method 100 of FIG. 2. In the mouth region 1103, the container layer 1203 comprises a holding ring 1204 for better processing of the container 406 in a filling machine. This also shows a differential 1207 in the heights of the container 406 and of the container blank 306. As a result of this difference in height, there is sufficient material available in the container blank 306 to be able to form the mouth region 1103 of the container 406 with the holding ring 1204 from the mouth region 1202 of the container blank 306. For this purpose, the container blank 306 is also pressed lengthwise as described above. Attempts to provide additional material solely by increasing the thickness of the blank wall 1201 often lead to formation of a squeeze bulge in the mouth region 1103 that can lead to processing faults in a filling machine. In addition, FIG. 12 shows an edge 1206 of the mouth region 1202 of the container blank 306. In method step b) 102, this edge 1206 is surrounded in a gap-free manner by the inner ring 602 and the outer ring 601 of the shaping tool 404. As a result, the edge 1206 is pressed cleanly, and a smooth edge 1205 of the mouth region 1103 of the container 406 is obtained without a burr. As a result, it is possible to seal a pull tab onto the edge 1205 as a closure without prior generation of a cut through the mouth region 1103 of the container 406. Since the edge 1205 has been pressed smoothly and has not been cut and hence is less absorptive, the sealing can be effected with a low amount of sealant.

FIG. 13 shows a schematic diagram of a further container 406 of the invention. This container 406 also takes the form of a bottle. The bottle again comprises a container wall 1101 that partly surrounds a container interior 1107. The container wall 1101 consists of a layer sequence of the following layers in superposed succession in the direction from the container interior 1107 outward: an inner polymer layer 1401 of EVOH, a container layer 1203, and an outer polymer layer 1402 of PET. The bottle has a container opening 1102 in a mouth region 1103. In addition, the mouth region 1103 has been provided with a screw thread 1301 for screwing on a lid as part of a closure. The screw thread 1301 has been formed here by the container layer 1203 and coated with the outer polymer layer 1402. The mouth region 1103 is connected to a bottle body 1105 via a bottle neck 1104. The container layer 1203 consists to an extent of 92.5% by weight, based on the total weight of the container layer 1203, of fibers obtained from spruce wood as ground wood with an average fiber length of 1.5 mm. In addition, the container layer 1203 has a moisture content of 7.4% by weight, based on the total weight of the container layer 1203, and includes 0.1% by weight of additives, for example AKD and ASA, as hydrophobizing agents, and Eka ATC 4150 from Eka Chemicals as flow agent. The container layer 1203 has an average thickness of 650 μm and is no thinner than 300 μm at any point in the container wall 1101. In addition, the container layer 1203 does not include any fold or crease at all. The inner polymer layer 1401 has an average layer thickness of 80 μm. The outer polymer layer 1402 has an average layer thickness of 50 μm. The container interior 1107 has a maximum diameter 1109 in a plane perpendicular to a height 1108 of the container interior 1107, where the container interior 1107 has a diameter less than the maximum diameter 1109 of the container interior 1107 in the direction from the plane to the container opening 1102, in the region of the bottle neck 1104 and the mouth region 1103.

FIG. 14 shows a schematic longitudinal section through the container 406 of FIG. 13. FIG. 14 shows that the outer polymer layer 1402 has been coated over the full area of the container layer 1203. In this case, the edge 1205 of the container layer 1203 which is at the top in FIG. 13 and runs around the container opening 1102 has been coated with the outer polymer layer 1402 but not with the inner polymer layer 1401. Since this edge 1205 for the use herein is not regarded either as facing or as being remote from the container interior 1107, the inner polymer layer 1401 is considered to have been fully coated.

FIG. 15 shows a schematic longitudinal section through a further container 406 of the invention that has the same shape as the container 406 of FIG. 13. The container layer 1203 here has been coated completely with the inner polymer layer 1401, and the inner polymer layer 1401 has also been coated onto the edge 1205. The outer polymer layer 1402 has been superimposed merely onto the edge 1205 of the container layer 1203 and applied there to the inner polymer layer 1401.

FIG. 16 shows a schematic longitudinal section through a further container 406 of the invention. The container 406 in FIG. 16 has the design of the container 406 in FIG. 13. In a departure from the container 406 in FIG. 13, the outer polymer layer 1402 here does not superimpose the container layer 1203 completely, but only over about 20% of the surface of the container layer 1203 remote from the container interior 1107. The container layer 1203 here has especially been coated with the outer polymer layer 1402 over the entire mouth region 1103 of the container 406.

FIG. 17 shows a flow diagram of a method 1700 of the invention for filling and closing a container 406. In a method step I) 1701, the container 406 of FIG. 15 is provided. The subsequent method steps II) 1702 and III) 1703 are conducted in a filling machine. In method step II) 1702, the container 406 is filled with a smoothie through its container opening 1102. In method step III) 1703, the container 406 thus filled is closed. For this purpose, an aluminum foil is sealed over the container opening 1102 by heat-sealing onto the edge 1205 using the outer polymer layer 1402 and the inner polymer layer 1402 as sealants.

LIST OF REFERENCE NUMERALS 100 method of the invention for producing a container
101 method step a)
102 method step b)
201 method step c)
301 negative mold of the container blank
302 mold interior of the negative mold of the container blank
303 mold wall of the negative mold of the container blank
304 opening of a multitude of openings in the mold wall of the negative mold of the container blank
305 mold opening of the negative mold of the container blank
306 container blank
400 negative mold of the container
401 mold wall of the negative mold of the container
402 mold interior of the negative mold of the container
403 opening of a multitude of openings in the mold wall of the negative mold of the container
404 shaping tool
405 solid body/hollow body
406 container of the invention 500 half-shell of the negative mold of the container blank
501 plastic carrier
502 sieve mold
601 outer ring
602 inner ring
701 first direction
801 further direction
1101 container wall
1102 container opening
1103 mouth region of the container
1104 bottle neck
1105 bottle body
1106 base
1107 container interior
1108 height of the container interior
1109 maximum diameter of the container interior
1201 blank wall
1202 mouth region of the container blank
1203 container layer
1204 holding ring
1205 edge of the mouth region of the container
1206 edge of the mouth region of the container blank
1207 difference in height of the container blank and the container
1301 screw thread
1401 inner polymer layer
1402 outer polymer layer
1700 method of the invention for filling and closing a container
1701 method step I)
1702 method step II)
1703 method step III)

The invention claimed is:

1. A method comprising, as method steps,
a) providing a container blank which has a height and comprises a blank wall at least partly surrounding a blank interior, comprising
i) a multitude of particles, and
ii) a liquid in a first proportion of liquid; and
b) shaping the container blank thereby obtaining a container comprising a container wall which at least partly surrounds a container interior and comprises a container layer comprising
i) the particles of the multitude of particles, and
ii) the liquid in a further proportion of liquid;
wherein the further proportion of liquid is less than the first proportion of liquid,
wherein the shaping in method step b) comprises reducing the height of the container blank.

2. The method as claimed in claim 1, wherein the container blank prior to method step b) is introduced into a negative mold of at least part of the container.

3. The method as claimed in claim 2, wherein the negative mold comprises a mold wall that at least partly surrounds a mold interior,
wherein the mold wall at least in parts
I. is permeable to the liquid, and
II. is less permeable to the particles of the multitude of particles compared to the liquid.

4. The method as claimed in claim 1, wherein the blank wall comprises a mouth region that forms a blank opening of the container blank,
wherein the shaping in method step b) comprises shaping the mouth region of the container blank thereby obtaining a mouth region of the container that forms a container opening of the container,
wherein the shaping of the mouth region of the container blank in method step b) comprises contacting the blank wall in the mouth region with a shaping tool,
wherein the contacting with the shaping tool comprises accommodating of the blank wall in the mouth region between an outer ring of the shaping tool and an inner ring of the shaping tool.

5. The method as claimed in claim 4, wherein the inner ring in the shaping tool is arranged and designed so as to be elastically deformable with respect to the outer ring.

6. The method as claimed in claim 4, wherein the blank wall in its mouth region comprises an edge surrounding the blank opening,
wherein the shaping tool in method step b) additionally surrounds the edge,
wherein the edge in method step b) is contacted with the inner ring.

7. The method as claimed in claim 4, wherein the inner ring is arranged and designed so as to be elastically deformable with respect to the outer ring in the shaping tool.

8. The method as claimed in claim 1, wherein the particles of the multitude of particles are fibers.

9. The method as claimed in claim 8, wherein the fibers comprise a chemical pulp or a mechanical pulp or both.

10. The method as claimed in claim 1, wherein the container wall has a container opening,
wherein the container interior
I) has a maximum diameter in a plane perpendicular to a height of the container interior, and
II) has a diameter less than the maximum diameter of the container interior at least in sections in the direction from the plane to the container opening.

11. The method as claimed in claim 1, wherein the method further comprises at least partly superimposing the container layer with an inner polymer layer on a side of the container layer facing the container interior.

12. The method as claimed in claim 1, wherein the method further comprises at least partly superimposing the container layer with an outer polymer layer on a side of the container layer remote from the container interior.

13. The method as claimed in claim 1, wherein the height of the container blank is reduced in method step b) to a value within a range from 50% to 99.9% of the height of the container blank in method step a).

14. The method as claimed in claim 1, wherein the reducing of the height of the container blank in method step b) comprises pressing the container blank in lengthwise direction with a pressure within a range from 200 to 10 000 $kN/m^2$, based on a maximum cross-sectional area of the container blank in a plane perpendicular to the height of the container blank.

* * * * *